(12) United States Patent
Bajgier et al.

(10) Patent No.: US 10,169,812 B1
(45) Date of Patent: ***Jan. 1, 2019

(54) PROVIDING FINANCIAL ACCOUNT INFORMATION TO USERS

(75) Inventors: Christopher Michael Bajgier, Avalon, PA (US); Michael Scott Ley, Moon Township, PA (US); Bryan Lee Mackrell, Cranberry Township, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 290 days.

This patent is subject to a terminal disclaimer.

(21) Appl. No.: 13/355,056

(22) Filed: Jan. 20, 2012

(51) Int. Cl.
*G06Q 40/02* (2012.01)
*G06Q 40/00* (2012.01)
*G06Q 40/06* (2012.01)
*G06Q 20/06* (2012.01)

(52) U.S. Cl.
CPC ............ *G06Q 40/02* (2013.01); *G06Q 20/06* (2013.01); *G06Q 40/06* (2013.01); *G06Q 40/12* (2013.12)

(58) Field of Classification Search
CPC .................................................... G06Q 40/00
USPC ..................................................... 705/42, 44
See application file for complete search history.

(56) References Cited

U.S. PATENT DOCUMENTS

| | | | |
|---|---|---|---|
| 4,367,402 A | 1/1983 | Giraud et al. | |
| 4,443,027 A | 4/1984 | McNeely et al. | |
| 4,648,037 A | 3/1987 | Valentino | |
| 4,837,422 A | 6/1989 | Dethloff et al. | |
| 5,101,200 A | 3/1992 | Swett | |
| 5,500,513 A | 3/1996 | Langhans et al. | |
| 5,621,640 A | 4/1997 | Burke | |
| 5,649,118 A | 7/1997 | Carlisle et al. | |

(Continued)

FOREIGN PATENT DOCUMENTS

| | | | |
|---|---|---|---|
| WO | WO 96/34358 A1 | 10/1996 | |
| WO | WO 00/19333 | * 4/2000 | ............ G06F 17/00 |
| WO | WO 03/030054 A1 | 4/2003 | |

OTHER PUBLICATIONS

U.S. Appl. No. 12/152,028, filed May 12, 2008.

(Continued)

*Primary Examiner* — Abhishek Vyas
(74) *Attorney, Agent, or Firm* — Buchanan Ingersoll & Rooney PC; Robert J. Pugh

(57) ABSTRACT

Various embodiments are directed to computer-implemented systems and methods for providing financial information to a user. A computing device may receive from a financial server system data indicative of a balance of a first financial account of the user; a balance of a second financial account of the user; and a balance of scheduled payments to be deducted from the first financial account. The computing device may provide a graphical interface to the user. The graphical user interface may comprise a balance indicator having a first segment having a first area proportional to the balance of the first financial account; a second segment having a second area proportional to the balance of the second financial account, wherein a sum of the first area and the second area is substantially constant independent of the balances of the first and second financial accounts; and a scheduled payments indicator.

18 Claims, 21 Drawing Sheets

(56) References Cited

U.S. PATENT DOCUMENTS

| | | | |
|---|---|---|---|
| 5,699,528 A * | 12/1997 | Hogan | G06Q 20/04 705/40 |
| 5,845,260 A | 12/1998 | Nakano et al. | |
| 5,918,217 A | 6/1999 | Maggioncalda et al. | |
| 5,953,710 A | 9/1999 | Fleming | |
| 5,963,925 A | 10/1999 | Kolling et al. | |
| 5,991,749 A | 11/1999 | Morrill, Jr. | |
| 6,012,044 A | 1/2000 | Maggioncalda et al. | |
| 6,032,134 A | 2/2000 | Weissman | |
| 6,044,360 A | 3/2000 | Picciallo et al. | |
| 6,049,776 A | 4/2000 | Donnelly et al. | |
| 6,052,675 A | 4/2000 | Checchio | |
| 6,064,984 A | 5/2000 | Ferguson et al. | |
| 6,064,986 A | 5/2000 | Edelman | |
| 6,085,174 A | 7/2000 | Edelman | |
| 6,088,682 A | 7/2000 | Burke | |
| 6,112,191 A | 8/2000 | Burke | |
| 6,128,603 A | 10/2000 | Dent et al. | |
| 6,173,269 B1 | 1/2001 | Solokl et al. | |
| 6,332,154 B2 | 12/2001 | Beck et al. | |
| 6,353,811 B1 | 3/2002 | Weissman | |
| 6,401,079 B1 | 6/2002 | Kahn et al. | |
| 6,411,938 B1 | 6/2002 | Gates et al. | |
| 6,473,794 B1 | 10/2002 | Guheen et al. | |
| 6,493,685 B1 * | 12/2002 | Ensel | G06Q 20/102 705/34 |
| 6,519,571 B1 | 2/2003 | Guheen et al. | |
| 6,601,233 B1 | 7/2003 | Underwood | |
| 6,609,110 B1 | 8/2003 | Dowd et al. | |
| 6,633,878 B1 | 10/2003 | Underwood | |
| 6,636,242 B2 | 10/2003 | Bowman-Amuah | |
| 6,636,833 B1 | 10/2003 | Flitcroft et al. | |
| 6,684,190 B1 | 1/2004 | Powers et al. | |
| 6,718,314 B2 | 4/2004 | Chaum et al. | |
| 6,718,535 B1 | 4/2004 | Underwood | |
| 6,742,002 B2 | 5/2004 | Arrowood | |
| 6,742,704 B2 | 6/2004 | Fitzmaurice et al. | |
| 6,839,687 B1 | 1/2005 | Dent et al. | |
| 6,839,692 B2 | 1/2005 | Carrott et al. | |
| 6,876,971 B1 | 4/2005 | Burke | |
| 6,921,268 B2 | 7/2005 | Bruno et al. | |
| 6,993,510 B2 | 1/2006 | Guy et al. | |
| 7,024,390 B1 | 4/2006 | Mori et al. | |
| 7,031,939 B1 | 4/2006 | Gallagher et al. | |
| 7,039,440 B2 | 5/2006 | Rodriguez et al. | |
| 7,062,458 B2 | 6/2006 | Maggioncalda et al. | |
| 7,076,465 B1 | 7/2006 | Blagg et al. | |
| 7,100,195 B1 | 8/2006 | Underwood | |
| 7,107,243 B1 * | 9/2006 | McDonald | G06Q 20/10 705/35 |
| 7,110,979 B2 | 9/2006 | Tree | |
| 7,143,064 B2 | 11/2006 | Picciallo et al. | |
| 7,146,338 B2 | 12/2006 | Kight et al. | |
| 7,147,149 B2 | 12/2006 | Giraldin et al. | |
| 7,165,041 B1 | 1/2007 | Guheen et al. | |
| 7,171,370 B2 | 1/2007 | Burke | |
| 7,175,073 B2 | 2/2007 | Kelley et al. | |
| 7,184,979 B1 | 2/2007 | Carson | |
| 7,248,855 B2 | 7/2007 | Joyce et al. | |
| 7,249,092 B2 | 7/2007 | Dunn et al. | |
| 7,249,097 B2 | 7/2007 | Hutchison et al. | |
| 7,263,507 B1 | 8/2007 | Brake, Jr. et al. | |
| 7,264,153 B1 | 9/2007 | Burke | |
| 7,319,986 B2 | 1/2008 | Praisner et al. | |
| 7,328,839 B2 | 2/2008 | Keohane et al. | |
| 7,346,528 B2 | 3/2008 | Thengvall et al. | |
| 7,376,569 B2 | 5/2008 | Plunkett et al. | |
| 7,379,887 B2 | 5/2008 | Pachon et al. | |
| 7,382,773 B2 | 6/2008 | Schoeneberger et al. | |
| 7,401,731 B1 | 7/2008 | Pietz et al. | |
| 7,502,758 B2 | 3/2009 | Burke | |
| 7,536,351 B2 | 5/2009 | Leblang et al. | |
| 7,571,849 B2 | 8/2009 | Burke | |
| 7,577,665 B2 | 8/2009 | Ramer et al. | |
| 7,580,881 B2 | 8/2009 | Singer et al. | |
| 7,620,573 B2 | 11/2009 | Jameson | |
| 7,627,512 B2 | 12/2009 | Harris et al. | |
| 7,627,527 B1 * | 12/2009 | Hildebrand | G06Q 20/10 705/39 |
| 7,647,322 B2 | 1/2010 | Thomsen | |
| 7,660,581 B2 | 2/2010 | Ramer et al. | |
| 7,668,768 B2 | 2/2010 | Oikonomidis | |
| 7,672,861 B2 | 3/2010 | Al-Otaibi et al. | |
| 7,685,083 B2 | 3/2010 | Fairweather | |
| 7,707,052 B2 | 4/2010 | Kuhn et al. | |
| 7,711,619 B2 | 5/2010 | Merton et al. | |
| 7,716,217 B2 | 5/2010 | Marston et al. | |
| 7,729,959 B1 | 6/2010 | Wells et al. | |
| 7,752,123 B2 | 7/2010 | Brookfield et al. | |
| 7,774,257 B2 | 8/2010 | Maggioncalda et al. | |
| 7,783,564 B2 | 8/2010 | Mullen et al. | |
| 7,788,146 B2 | 8/2010 | McCarthy, Jr. | |
| 7,792,748 B1 | 9/2010 | Ebersole et al. | |
| 7,797,181 B2 | 9/2010 | Vianello | |
| 7,797,218 B2 | 9/2010 | Rosen et al. | |
| 7,797,226 B2 | 9/2010 | Ram et al. | |
| 7,801,814 B2 | 9/2010 | Cataline et al. | |
| 7,809,641 B2 | 10/2010 | Sanders et al. | |
| 7,818,233 B1 | 10/2010 | Sloan | |
| 7,827,102 B2 | 11/2010 | Saliba et al. | |
| 7,831,494 B2 | 11/2010 | Sloan et al. | |
| 7,835,972 B2 | 11/2010 | Almeida et al. | |
| 7,844,492 B2 | 11/2010 | Perkowski et al. | |
| 7,844,546 B2 | 11/2010 | Fleishman | |
| 7,848,948 B2 | 12/2010 | Perkowski et al. | |
| 7,860,871 B2 | 12/2010 | Ramer et al. | |
| 7,865,187 B2 | 1/2011 | Ramer et al. | |
| 7,870,066 B2 | 1/2011 | Lin | |
| 7,912,790 B2 | 3/2011 | Albertsson | |
| 7,937,292 B2 | 5/2011 | Baig et al. | |
| 7,949,594 B2 * | 5/2011 | Holm-Blagg | G06Q 40/00 705/35 |
| 7,962,419 B2 | 6/2011 | Gupta et al. | |
| 8,015,090 B1 | 9/2011 | Borzych et al. | |
| 8,065,230 B1 | 11/2011 | Little | |
| 8,086,558 B2 | 12/2011 | Dewar | |
| 8,099,350 B2 | 1/2012 | Ryder | |
| 8,639,622 B1 * | 1/2014 | Moore et al. | 705/43 |
| 2001/0047310 A1 | 11/2001 | Russell | |
| 2002/0002479 A1 | 1/2002 | Almog et al. | |
| 2002/0007330 A1 | 1/2002 | Kumar et al. | |
| 2002/0026412 A1 | 2/2002 | Kabin | |
| 2002/0038289 A1 * | 3/2002 | Lawlor | G06Q 20/04 705/42 |
| 2002/0046074 A1 | 4/2002 | Barton | |
| 2002/0052773 A1 | 5/2002 | Kraemer et al. | |
| 2002/0055870 A1 | 5/2002 | Thomas | |
| 2002/0077955 A1 | 6/2002 | Ramm | |
| 2002/0095363 A1 | 7/2002 | Sloan et al. | |
| 2002/0099635 A1 | 7/2002 | Guiragosian | |
| 2002/0103805 A1 | 8/2002 | Canner et al. | |
| 2002/0120568 A1 | 8/2002 | Leblang et al. | |
| 2002/0123949 A1 | 9/2002 | VanLeeuwen | |
| 2002/0133368 A1 | 9/2002 | Strutt et al. | |
| 2002/0147672 A1 | 10/2002 | Gaini | |
| 2002/0152158 A1 | 10/2002 | Paleiov et al. | |
| 2002/0188536 A1 | 12/2002 | Molosavljevic et al. | |
| 2003/0009411 A1 | 1/2003 | Ram et al. | |
| 2003/0033226 A1 | 2/2003 | Anderson | |
| 2003/0050889 A1 | 3/2003 | Burke | |
| 2003/0055758 A1 | 3/2003 | Sidhu et al. | |
| 2003/0083930 A1 | 5/2003 | Burke | |
| 2003/0135634 A1 | 7/2003 | Moeller et al. | |
| 2003/0177027 A1 | 9/2003 | Dimarco | |
| 2003/0191711 A1 * | 10/2003 | Jamison | G06Q 20/04 705/40 |
| 2003/0216957 A1 | 11/2003 | Florence et al. | |
| 2003/0221118 A1 | 11/2003 | Walker | |
| 2004/0012588 A1 | 1/2004 | Lulls | |
| 2004/0019543 A1 | 1/2004 | Blagg et al. | |
| 2004/0044632 A1 | 3/2004 | Onn et al. | |
| 2004/0054610 A1 | 3/2004 | Amstutz et al. | |
| 2004/0068432 A1 | 4/2004 | Meyerkopf et al. | |
| 2004/0088177 A1 | 5/2004 | Travis et al. | |

(56) References Cited

U.S. PATENT DOCUMENTS

| | | |
|---|---|---|
| 2004/0107112 A1 | 6/2004 | Cotter |
| 2004/0117202 A1 | 6/2004 | Winklevoss et al. |
| 2004/0148234 A1 | 7/2004 | Gonen-Friedman et al. |
| 2004/0158513 A1 | 8/2004 | Musacchio |
| 2004/0186852 A1 | 9/2004 | Rosen |
| 2004/0192351 A1 | 9/2004 | Duncan |
| 2004/0215560 A1 | 10/2004 | Amalraj et al. |
| 2004/0215564 A1* | 10/2004 | Lawlor ............. G06Q 20/04 705/40 |
| 2004/0225609 A1* | 11/2004 | Greene ............ G06Q 20/10 705/40 |
| 2004/0254805 A1 | 12/2004 | Schwerin-Wenzel et al. |
| 2004/0267559 A1 | 12/2004 | Hinderer et al. |
| 2005/0026119 A1 | 2/2005 | Ellis et al. |
| 2005/0027632 A1 | 2/2005 | Zeitoun et al. |
| 2005/0060228 A1 | 3/2005 | Woo |
| 2005/0060318 A1 | 3/2005 | Brickman, Jr. |
| 2005/0080691 A1 | 4/2005 | Holm-Blagg |
| 2005/0086075 A1 | 4/2005 | Kaehler et al. |
| 2005/0154662 A1 | 7/2005 | Langenwalter |
| 2005/0164151 A1 | 7/2005 | Klein |
| 2005/0187804 A1 | 8/2005 | Clancy et al. |
| 2005/0240431 A1 | 10/2005 | Cotter |
| 2005/0282126 A1 | 12/2005 | Pesso |
| 2006/0064378 A1 | 3/2006 | Clementz et al. |
| 2006/0069635 A1 | 3/2006 | Ram et al. |
| 2006/0095331 A1 | 5/2006 | O'Malley et al. |
| 2006/0100919 A1 | 5/2006 | Levine |
| 2006/0122922 A1 | 6/2006 | Lowenthal |
| 2006/0122923 A1 | 6/2006 | Burke |
| 2006/0149609 A1 | 7/2006 | Stenerson et al. |
| 2006/0163341 A1 | 7/2006 | Tulluri et al. |
| 2006/0178971 A1 | 8/2006 | Owen et al. |
| 2006/0224478 A1 | 10/2006 | Harbison et al. |
| 2006/0235777 A1 | 10/2006 | Takata |
| 2006/0242084 A1 | 10/2006 | Moses |
| 2006/0277091 A1 | 12/2006 | Kochikar et al. |
| 2006/0277128 A1 | 12/2006 | Anandarao et al. |
| 2006/0282353 A1 | 12/2006 | Gikandi |
| 2006/0282369 A1 | 12/2006 | White |
| 2007/0005477 A1 | 1/2007 | McAtamney |
| 2007/0005524 A1 | 1/2007 | Iwachin |
| 2007/0034688 A1 | 2/2007 | Burke |
| 2007/0038545 A1 | 2/2007 | Smith et al. |
| 2007/0038610 A1 | 2/2007 | Omoigui |
| 2007/0055549 A1 | 3/2007 | Moore et al. |
| 2007/0055602 A1 | 3/2007 | Mohn |
| 2007/0060109 A1 | 3/2007 | Ramer et al. |
| 2007/0060173 A1 | 3/2007 | Ramer et al. |
| 2007/0061252 A1 | 3/2007 | Burke |
| 2007/0061257 A1 | 3/2007 | Neofytides et al. |
| 2007/0061333 A1 | 3/2007 | Ramer et al. |
| 2007/0083465 A1 | 4/2007 | Ciurea et al. |
| 2007/0094130 A1 | 4/2007 | Burke |
| 2007/0100749 A1 | 5/2007 | Bachu et al. |
| 2007/0112662 A1 | 5/2007 | Kumar |
| 2007/0156519 A1 | 7/2007 | Agassi et al. |
| 2007/0162301 A1 | 7/2007 | Sussman et al. |
| 2007/0162387 A1 | 7/2007 | Cataline et al. |
| 2007/0179841 A1 | 8/2007 | Agassi et al. |
| 2007/0185721 A1 | 8/2007 | Agassi et al. |
| 2007/0192318 A1 | 8/2007 | Ramer et al. |
| 2007/0208588 A1 | 9/2007 | Rhoades et al. |
| 2007/0208624 A1 | 9/2007 | Gallagher |
| 2007/0214162 A1 | 9/2007 | Rice |
| 2007/0231777 A1 | 10/2007 | Dimarco |
| 2007/0241120 A1 | 10/2007 | Henry |
| 2007/0255965 A1 | 11/2007 | McGucken |
| 2007/0298392 A1 | 12/2007 | Mitchell |
| 2008/0015970 A1 | 1/2008 | Brookfield et al. |
| 2008/0015988 A1 | 1/2008 | Brown et al. |
| 2008/0040845 A1 | 2/2008 | Shoshan |
| 2008/0060241 A1 | 3/2008 | Molinaro |
| 2008/0120129 A1 | 5/2008 | Seubert et al. |
| 2008/0133393 A1 | 6/2008 | Arnold et al. |
| 2008/0140559 A1 | 6/2008 | Ram et al. |
| 2008/0183545 A1 | 7/2008 | Deitrich et al. |
| 2008/0195512 A1 | 8/2008 | Klebanoff et al. |
| 2008/0195556 A1 | 8/2008 | Vioni |
| 2008/0201208 A1 | 8/2008 | Tie et al. |
| 2008/0208638 A1 | 8/2008 | Davidson et al. |
| 2008/0243716 A1 | 10/2008 | Ouimet et al. |
| 2008/0249936 A1 | 10/2008 | Miller et al. |
| 2008/0270304 A1* | 10/2008 | Brown ............. G06Q 20/10 705/44 |
| 2008/0319781 A1 | 12/2008 | Stivoric et al. |
| 2009/0006418 A1 | 1/2009 | O'Malley |
| 2009/0063353 A1 | 3/2009 | Viidu et al. |
| 2009/0092241 A1 | 4/2009 | Minert et al. |
| 2009/0094170 A1 | 4/2009 | Mohn |
| 2009/0112674 A1 | 4/2009 | Musso |
| 2009/0119013 A1 | 5/2009 | O'Malley |
| 2009/0132313 A1 | 5/2009 | Chandler et al. |
| 2009/0138341 A1 | 5/2009 | Mohan et al. |
| 2009/0177688 A1 | 7/2009 | Karlsen et al. |
| 2009/0182664 A1 | 7/2009 | Trombley |
| 2009/0192874 A1 | 7/2009 | Powles et al. |
| 2009/0204448 A1 | 8/2009 | Kaehler et al. |
| 2009/0204455 A1 | 8/2009 | Rubin |
| 2009/0204538 A1 | 8/2009 | Ley et al. |
| 2009/0216641 A1 | 8/2009 | Hubbard |
| 2009/0234697 A1 | 9/2009 | Taguchi |
| 2009/0254469 A1 | 10/2009 | Robertson |
| 2009/0276231 A1 | 11/2009 | Bazigos et al. |
| 2009/0276258 A1 | 11/2009 | Dane |
| 2009/0292648 A1 | 11/2009 | Damschroder et al. |
| 2009/0319289 A1 | 12/2009 | Pande |
| 2009/0319344 A1 | 12/2009 | Tepper et al. |
| 2009/0327051 A1 | 12/2009 | Nerby |
| 2009/0327106 A1 | 12/2009 | Bartelt et al. |
| 2010/0023385 A1 | 1/2010 | Galvan |
| 2010/0030671 A1 | 2/2010 | Gelerman |
| 2010/0031157 A1* | 2/2010 | Neer ............. G06Q 10/06 715/738 |
| 2010/0063981 A1 | 3/2010 | Thomsen |
| 2010/0070323 A1 | 3/2010 | Polcari et al. |
| 2010/0070448 A1 | 3/2010 | Omoigui |
| 2010/0100424 A1 | 4/2010 | Buchanan et al. |
| 2010/0100427 A1 | 4/2010 | McKeown et al. |
| 2010/0100464 A1 | 4/2010 | Ellis et al. |
| 2010/0100469 A1 | 4/2010 | Buchanan et al. |
| 2010/0100470 A1 | 4/2010 | Buchanan et al. |
| 2010/0100561 A1 | 4/2010 | Cooper et al. |
| 2010/0106566 A1 | 4/2010 | Al-Otaibi et al. |
| 2010/0114672 A1 | 5/2010 | Klaus et al. |
| 2010/0125475 A1 | 5/2010 | Twyman |
| 2010/0131306 A1 | 5/2010 | Koo |
| 2010/0145861 A1 | 6/2010 | Law et al. |
| 2010/0145876 A1 | 6/2010 | Pessin |
| 2010/0153211 A1 | 6/2010 | Ramer et al. |
| 2010/0179916 A1 | 7/2010 | Johns et al. |
| 2010/0180029 A1 | 7/2010 | Fourman |
| 2010/0198863 A1 | 8/2010 | Lee et al. |
| 2010/0217652 A1 | 8/2010 | Brooks Rix |
| 2010/0235299 A1 | 9/2010 | Considine |
| 2010/0287086 A1 | 11/2010 | Harris et al. |
| 2010/0299277 A1 | 11/2010 | Emelo et al. |
| 2010/0306017 A1 | 12/2010 | Dreyfuss et al. |
| 2010/0312713 A1 | 12/2010 | Keltner |
| 2010/0312718 A1 | 12/2010 | Rosenthal et al. |
| 2010/0332309 A1* | 12/2010 | Mason ............. G06Q 20/10 705/14.35 |
| 2010/0332379 A1 | 12/2010 | Ram et al. |
| 2011/0055209 A1* | 3/2011 | Novac ............. G06F 17/211 707/737 |
| 2011/0107265 A1* | 5/2011 | Buchanan ........... G06Q 30/02 715/835 |
| 2011/0173118 A1 | 7/2011 | Hu |

(56) References Cited

U.S. PATENT DOCUMENTS

2011/0276494 A1 11/2011 Hutchinson et al.
2011/0282803 A1 11/2011 Woods et al.

OTHER PUBLICATIONS

U.S. Appl. No. 12/152,074, filed May 12, 2008.
U.S. Appl. No. 12/120,995, filed May 15, 2008.
U.S. Appl. No. 12/479,378, filed Jun. 5, 2009.
U.S. Appl. No. 12/696,959, filed Jan. 29, 2010.
U.S. Appl. No. 12/696,968, filed Jan. 29, 2010.
U.S. Appl. No. 12/696,647, filed Jan. 29, 2010.
U.S. Appl. No. 12/803,705, filed Jul. 2, 2010.
U.S. Appl. No. 13/037,063, filed Feb. 28, 2011.
U.S. Appl. No. 13/037,072, filed Feb. 28, 2011.
U.S. Appl. No. 13/037,096, filed Feb. 28, 2011.
U.S. Appl. No. 12/803,707, filed Jul. 2, 2010.
U.S. Appl. No. 12/803,706, filed Jul. 2, 2010.
U.S. Appl. No. 12/754,967, filed Jul. 2, 2010.
U.S. Appl. No. 12/754,974, filed Apr. 6, 2010.
U.S. Appl. No. 12/803,684, filed Jul. 2, 2010.
U.S. Appl. No. 13/324,534, filed Dec. 13, 2011.
U.S. Appl. No. 13/324,575, filed Dec. 13, 2011.
U.S. Appl. No. 13/324,596, filed Dec. 13, 2011.
Ronald Lipman, "Adding family to credit card not always wise," *Houston Chronicle*, dated Jan. 18, 2008, printed from chron.com, 2 pages.
Lawrence Kutner, "Parent & Child," *The New York Times*, dated Aug. 19, 1993, printed from http://query.nytimes.com/gst/fullpage.html?res=9F0CE1DA153CF93AA2575BC0A965958260&sec=&, Internet site, accessed on Feb. 1, 2008, 3 pages.
Jane J. Kim, "Managing Your Money in Public View," *The Wall Street Journal*, dated Jun. 14, 2007, printed from http://online.wsj.com/article/SB118177906703834565.html, Internet site, accessed on Apr. 11, 2008, 5 pages.
"Obopay—Money Transfer by Cell Phone or Web," printed from https://www.obopay.com/consumer/GetHelp.do?target=HelpHow-Works, Internet site, accessed on Apr. 11, 2008, 4 pages.
"BillMonk.com," printed from https://www.billmonk.com/about/tour, Internet site, accessed on Apr. 11, 2008, 8 pages.
"Split It by TD Canada Trust Facebook," printed from http://www.facebook.com/apps/application.php?id=4245957541&ref=nf, Internet site, accessed on Apr. 11, 2008, 2 pages.
"ING Direct Electric Orange Checking Account," printed from http://banking.about.com/od/checkingaccounts/p/ingchecking.htm, Internet site, accessed on Apr. 11, 2008, 1 page.
"Know your financial health—at a glance!" printed from http://www.buxfer.com/tour.php?id=Home_Page, Internet site, accessed on Apr. 11, 2008, 1 page.
"Use Buxfer's analytics to understand your finances," printed from http://www.buxfer.com/tour.php?id=Analytics, Internet site, accessed on Apr. 11, 2008, 1 page.
"Use Buxfer Groups to simplify shared finances," printed from http://www.buxfer.com/tour.php?id=Groups, Internet site, accessed on Apr. 11, 2008, 1 page.
"Report transactions easily; let Buxfer deal with the math," printed from http://www.buxfer.com/tour.php?id=Reporting, Internet site, accessed on Apr. 11, 2008, 1 page.
"Import statements from banks or credit card accounts," printed from http://www.buxfer.com/tour.php?id=Import, Internet site, accessed on Apr. 11, 2008, 1 page.
"Slice and dice through your transactions," printed from http://www.buxfer.com/tour.php?=Filters, Internet site, accessed on Apr. 11, 2008, 1 page.
"Transfer money online with Amazon Payments," printed from http://www.buxfer.com/tour.php?id=Send money, Internet site, accessed on Apr. 11, 2008, 1 page.

"Setup budgets to control your expenses," printed from http://www.buxfer.com/tour.php?id=Budgets, Internet site, accessed on Apr. 11, 2008, 1 page.
"Access Buxfer while on the move!" printed from http://www.buxfer.com/tour.php?id=Mobile, Internet site, accessed on Apr. 11, 2008, 1 page.
"Take Buxfer with you on the Internet everywhere!" printed from http://www.buxfer.com/tour.php?id=Gadgets, Internet site, accessed on Apr. 11, 2008, 1 page.
"Amazon Payments Account Management," printed from https://payments.amazon.com/sdui/sdui/paymentabout?about=true, Internet site, accessed on Apr. 11, 2008, 1 page.
"Living with a Roommate in Memphis," memphis apartments tv.com, dated Feb. 15, 2007, printed from http://www.memphisapartmentstv.com/living-with-a-roommate-in-memphis/, Internet site, accessed on Sep. 18, 2007, 2 pages.
"Billshare—a simple app for people who share bills," printed from http://billshare.org/, Internet site, accessed on Sep. 18, 2007, 2 pages.
"Get More from Your PayPal Account," printed from https://www.paypal.com/us/cgi-bin/webscr?cmd=xpt/cps/general/AccountOverview-outside, Internet site, accessed on Sep. 18, 2007, 2 pages.
"How PayPal Works—PayPal," printed from https://www.paypal.com/us/cgi-bin/webscr?cmd=xpt/cps/general/NewConsumerWorks-outside, Internet site, accessed on Sep. 18, 2007, 3 pages.
"Sending Money Person-to-Person is Easy," printed from https://www.paypal.com/us/cgi-bin/webscr?cmd=xpt/cps/general/PersonPayments-outside, Internet site, accessed on Sep. 18, 2007, 1 page.
"Track Your Online Spending," printed from https://www.paypal.com/us/cgi-bin/webscr?cmd=xpt/cps/general/TrackingMoney-outside, Internet site, accessed on Sep. 18, 2007, 2 page.
"Enter Details—PayPal," printed from https://www.paypal.com/us/cgi-bin/webscr?cmd=_flow&SESSION=6paX9BKc4FK4EJ8, Internet site, accrssed on Sep. 18, 2007, 1 page.
"Review Payment Details—PayPal," printed from https://www.paypal.com/us/cgi-bin/webscr?cmd=_flow&Session=RMXX7KRmlnYnF, Internet site, accessed on Sep. 18, 2007, 1 page.
"Savings Plan," printed from http://quicken.intuit.com/images/screenshots/ss_savings_plan_lrg.gif, Internet site, accessed on Mar. 19, 2008, 1 page.
"Quicken Deluxe 2008," printed from http://quicken.intuit.com/personal-finance/deluxe-money-management.jhtml, Internet site, accessed on Mar. 19, 2008, 7 pages.
"SMS Banking," brochure by Acette Technologies FZ LLC, dated 2007, 3 pages.
Tim Ferguson, "Mobile banking rolled out by HSBC," dated Oct. 4, 2006, printed from http://www.silicon.com/financialservices/0,3800010322,39162983,00.htm, Internet site, accessed on Oct. 11, 2007, 2 pages.
Julian Goldsmith, "Cashing in on the ATM revolution," dated May 2, 2007, printed from http://www.silicon.com/financialservices/0,3800010322,39166938,00.htm, Internet site, accessed on Oct. 11, 2007, 3 pages.
Shelley Elmblad, "Online Banking is Easy on Budgets," dated May 22, 2007, printed from http://building-personal-savings.suite101.com/article.cfm/online_banking_get_the_facts, Internet site, accessed on Oct. 12, 2007, 2 pages.
John R. Quain, "Cellphone Banking Is Coming of Age," dated May 24, 2007, printed from http://www.nytimes.com/2007/05/24/technology/24basics.html?_r=1&oref=slogin, Internet site, accessed on Oct. 12, 2007, 4 pages.
"Ducont—Mobile Payments," printed from http://www.ducont.com/Products/bnf_mdhm.htm, Internet site, accessed on Oct. 11, 2007, 1 page.
"Ducont—Bank.companion," printed from http://www.ducont.com/Products/bnf_bankcomp.htm, Internet site, accessed on Oct. 11, 2007, 1 page.
"MyCheckFree.com," printed from https://mycheckfree.com/br/wps?sp=10001&rq=bfbl, Internet site, accessed on Sep. 14, 2007, 1 page.

(56) References Cited

OTHER PUBLICATIONS

"About CheckFree," printed from https://mycheckfree.com/br/wps?rq=login&slpg=Y&file=authentication/login_baseline_about-checkfree&esc=93096239&sp=, Internet site, accessed on Sep. 14, 2007, 1 page.
"MyCheckFree—Frequently Asked Questions," printed from https://mycheckfree.com/br/wps?rq=login&slpg=Y&file=authentication/login_baseline_faq&esc=93096239&sp=10001, Internet site, accessed on Sep. 14, 2007, 5 page.
"Paytrust : Paying Bills Has Never Been Easier," printed from http://www.paytrust.com/learnmore.shtml, Internet site, accessed on Sep. 14, 2007, 2 pages
"Why Use Paytrust® Instead of a Traditional Bill-Pay Service?" printed from http://www.paytrust.com/morethanbillpay.shtml, Internet site, accessed on Sep. 14, 2007, 3 pages.
Richard Irons, "What is Envelope Budgeting—Why the Envelope Budgeting System is so Effective?" printed from http://www.mvelopes.com/articles/envelope-budgeting.php, Internet site, 3 pages.
"Pocket Quicken," printed from http://www.landware.com/pocketquicken Internet site, accessed on Sep. 14, 2007, 2 pages.
"Mobile Quicken™—Stand Alone or Connect with a Click," printed from http://www.landware.com/pocketquicken/moreinfo.html Internet site, accessed on Sep. 14, 2007, 4 pages.
"UnitedOne Credit Union," printed from http://www.unitedone.org/ASP/home.asp, Internet site, accessed on Sep. 14, 2007, 3 pages.
"UnitedOne Credit Union—Calendar Help," printed from https://s146.lanxtra.com/servlet/EchoTemplateServlet?template=/2/en/IBHelp.vm&help=10901, Internet site, accessed on Sep. 14, 2007, 5 pages.
"Quicken Starter Edition 2008," printed from http://quicken.intuit.com/personal-finance/starter-edition-personal-budget.ihtml, Internet site, accessed on Sep. 14, 2007, 5 pages.
"Jul. 2007 calendar," printed from http://quicken.intuit.com/imaqes/screenshots/ss_calendar_lrq.gif, Internet site, accessed on Sep. 14, 2007, 1 page.
"Navigator," dated Jul. 2006, printed from www.pscu.org Internet site accessed on Oct. 17, 2007, 2 pages.
"Bank of America Privacy Assist Premier™—Protect your credit and identity," printed from http://www.bankofamerica.com/pap/index.cfm?template=pap_assist_premier, Internet site, accessed on Oct. 17, 2007, 2 pages.
"Identity Theft Protection—Bank of America Privacy Assist Premier™," printed from http://www.bankofamerica.com/pap/index.cfm?template=pap_assist_premier, Internet site, accessed on Oct. 17, 2007, 2 pages.
"Bank of America—Online Bill Pay and e-Bills Frequently Asked Questions," printed from http://www.bankofamerica.com/onlinebanking/index.cfm?template=faq_billpay, Internet site, accessed on Oct. 17, 207, 2 pages.
"Technology Credit Union," printed from http://www.techcu.com/resources/about_tech_cu/privacy/online.htm Internet site, accessed on Oct. 17, 2007, 1 page.
"Billshare.org—Make Bill Paying with Roomies Easy—KillerStartups.com," printed from http://www.killerstartups.com/Web20/billshare--Make-Bill-Paying-with-Roomies-Easy/, Internet site, accessed on Sep. 18, 2007, 4 pages.
Every Penny Counts, Inc., Patent Property Due Diligence Chart, prepared Aug. 30, 2007, 8 pages.
David A. Moss, Gibbs A. Johnson, "The rise of consumer bankruptcy: Evolution, revolution, or both?" American Bankruptcy Law Journal, v. 73, n. 2, pp. 311-351, Spring 1999, printed from http://dialogquicksearch.dialog.com/USPTO/search/getDocument.action?r=5cb38c39-dcc8, Internet site, accessed on Sep. 26, 2010, 25 pages.
Phillip Robinson, "Mastering Your Money," *San Jose Mercury News*, Oct. 9, 1994, 3 pages.
Tom Rawstorne, "What's your child buying online?; Alcohol, knives, pornography . . . All bought over the internet by a 14-year-old boy using a debit card. So why are the banks giving them to children without telling their parents?" *Daily Mail*, London, Jul. 10, 2008, p. 50, retrieved Jun. 30, 2011, 5 pages.
CNNMoney.com, "What are you worth?" printed from http://web.archive.org/web/20021008185050/http://cgi.money.cnn.com/tools/networth/networth.html, Internet site, accessed on Jul. 13, 2011, 2 pages.
Office Action dated Sep. 28, 2010 for U.S. Appl. No. 12/152,073, filed May 12, 2008.
Notice of Allowance dated May 3, 2011 for U.S. Appl. No. 12/152,073, filed May 12, 2008.
Office Action dated Apr. 2, 2009 for U.S. Appl. No. 12/152,028, filed May 12, 2008.
Office Action dated Sep. 16, 2009 for U.S. Appl. No. 12/152,028, filed May 12, 2008.
Office Action dated Jun. 15, 2010 for U.S. Appl. No. 12/152,028, filed May 12, 2008.
Office Action dated Oct. 1, 2010 for U.S. Appl. No. 12/152,074, filed May 12, 2008.
Office Action dated Apr. 13, 2010 for U.S. Appl. No. 12/120,995, filed May 15, 2008.
Notice of Allowance dated Sep. 23, 2010 for U.S. Appl. No. 12/120,995, filed May 15, 2008.
Office Action dated Jul. 8, 2011 for U.S. Appl. No. 12/366,711, filed Feb. 6, 2009.
Office Action dated Aug. 4, 2011 for U.S. Appl. No. 12/479,378, filed Jun. 5, 2009.
Office Action dated Jan. 3, 2012 for U.S. Appl. No. 12/696,968, filed Jan. 29, 2010.
Office Action dated Jan. 3, 2012 for U.S. Appl. No. 12/696,959, filed Jan. 29, 2010.
Office Action dated Mar. 21, 2012 for U.S. Appl. No. 12/366,711, filed Feb. 6, 2009.
Office Action dated Mar. 15, 2012 for U.S. Appl. No. 12/479,378, filed Jun. 5, 2009.
Office Action dated Feb. 1, 2012 for U.S. Appl. No. 12/696,647, filed Jan. 29, 2010.
Yahoo! UI Library: Slider, accessed via Way Back Machine, Oct. 6, 2006, http://web.archive.org/web/20061006221351/http://developer.yahoo.com/yui/slider/, on Mar. 8, 2012, 3 pages.
"How can I automatically generate an index in Word?," printed from http://word.mvps.org/faqs/formatting/CreateIndexContent.htm, Internet site, accessed on Feb. 17, 2011, 4 pages.
"PeopleSoft Enterprise Human Capital Management—Employee Benefits and Compensation Modules," printed from http://www.2020software.com/products/PeopleSoft_Enterprise_Human_Capital_Management_Employee_Benefits_and_Compensation_Modules.asp, Internet site, accessed on Jul. 17, 2011, 7 pages.
"Free Online Employee Attendance Tracking Software," printed from http://www.tracksmart.com Internet site, accessed on Jul. 17, 2011, 2 pages.
"Compensation Software Solutions for Small Business I Taleo," printed from http://www.taleo.com/solutions/taleo-business-edition-comp?_kk=HR%, Internet site, accessed on Jul. 17, 2011, 1 page.
"Tracking training has never been so easy." printed from http://www.conductit.com/, Internet site, accessed on Jul. 17, 2011, 2 pages.
"Track Employee Training Easily with Conductor® Employee Education Training Tracking Software," printed from http://www.conductit.com/product.asp, Internet site, accessed on Jul. 17, 2011, 2 pages.
"HSBC Employee Career Track Information," printed from http://www.hsbcusa.com/careers/hsbc_employees/impacted_employee_information.html, Internet site, accessed on Jul. 17, 2011, 2 pages.
"Conductor® at a glance Take the Quick Tour!" printed from http://www.conductit.com/tour.asp#1, Internet site, accessed on Jul. 17, 2011, 11 pages.
"Replicon—Time Tracking made Easy with Web TimeSheet," printed from http://www.replicon.com/lp/lp_to_vacation_tracking.aspx?, Internet site, accessed on Jul. 17, 2011, 2 pages.
Office Action dated Apr. 18, 2012 for U.S. Appl. No. 13/037,063, filed Feb. 28, 2011.

\* cited by examiner

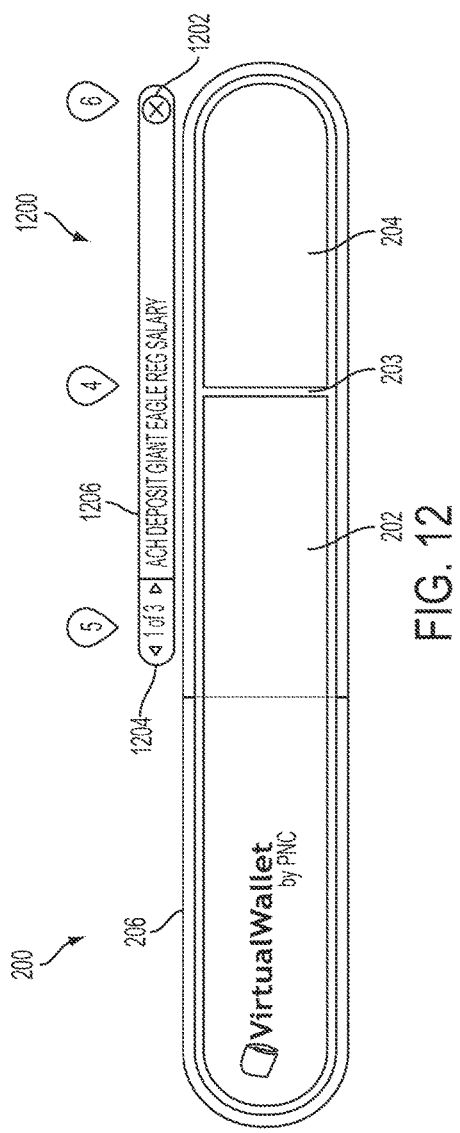
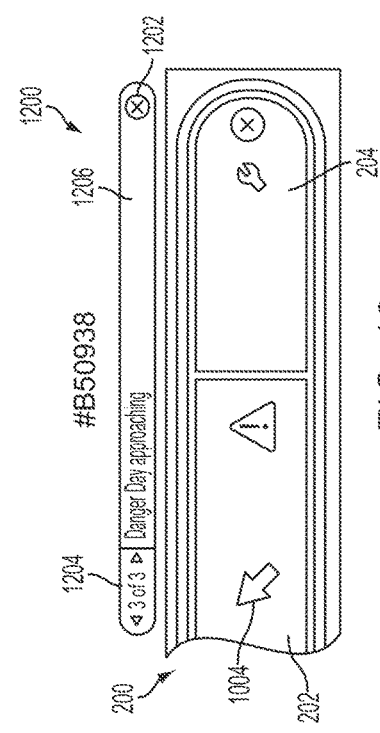

PROVIDING FINANCIAL ACCOUNT INFORMATION TO USERS

BACKGROUND

Banking institutions frequently offer Internet banking products and services to their customers as an alternative to traditional "brick and mortar" banking channels. Such products and services are typically provided via a user interface (UI) of a secure banking Web site that is hosted by the bank and that is remotely accessible by its customers using, for example, a personal computer (PC) or other network-enabled device. Products and services that may be offered to Internet banking customers include, for example, account balance inquiries, electronic funds transfers, transaction information downloads, bill presentment and payment, loan applications, and investment services. From a customer standpoint, advantages of Internet banking include the ability to interact with their banking institution any time from virtually any location, the ability to manage their finances from a single source, and increased transactional speed. Internet banking additionally provides significant economic benefits to the banking institution by reducing paper handling and teller interactions.

For banking institutions, customer visualization of and interaction with information presented via the UI plays a large role in determining customer satisfaction and, consequently, customer enrollment and retention. For many customers, the ability to quickly assess and understand their financial condition based on, for example, the amount of money currently available to spend, current and upcoming financial obligations, and as well as their progress in meeting future financial goals, is essential. Similarly, the ability to distribute funds between accounts in a manner that enhances the customer's understanding of his finances is desirable.

Internet banking UIs currently in use do not adequately consolidate and present customer information such that customers may quickly assess financial conditions to determine if any adjustments are necessary.

SUMMARY

Various embodiments are directed to computer-implemented systems and methods for providing financial information to a user. A computing device may receive from a financial server system data indicative of a balance of a first financial account of the user; a balance of a second financial account of the user; and a balance of scheduled payments to be deducted from the first financial account. The computing device may provide a graphical interface to the user. The graphical user interface may comprise a balance indicator having a first segment having a first area proportional to the balance of the first financial account; a second segment having a second area proportional to the balance of the second financial account, wherein a sum of the first area and the second area is substantially constant independent of the balances of the first and second financial accounts; and a scheduled payments indicator. The scheduled payments indicator may be positioned relative to the first segment so as to indicate a portion of the balance of the first financial account necessary to meet the balance of scheduled payments. The graphical user interface may have a default state where numerical values for the first balance and the second balance are not displayed.

FIGURES

Various embodiments of the present invention are described herein, by way of example, in conjunction with the following Figures wherein:

FIG. 12 is a screen shot showing one embodiment of the balance indicator of FIG. 2 comprising an alert field displayed therewith.

FIG. 13 is a screen shot showing one embodiment of the balance indicator of FIG. 3 and alert field of FIG. 12 with a different alert displayed.

DESCRIPTION

Figure 1:
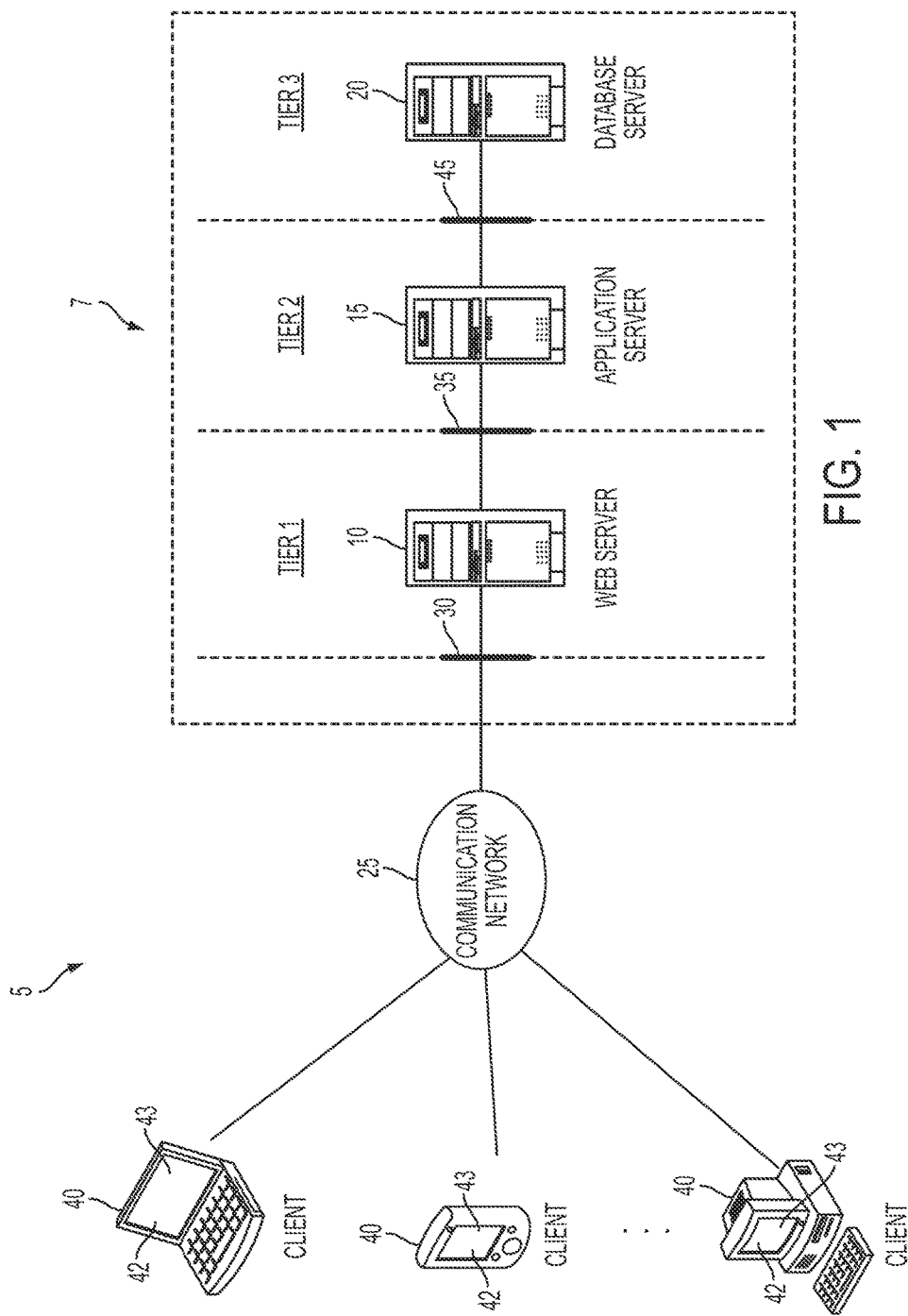
FIG. 1 is a block diagram illustrating one embodiment of an environment for providing Internet banking products to a customer.

Various embodiments described herein are directed generally to a graphical desktop user interface (desktop UI) that may be provided by or for a financial institution to its customers. The desktop UI may be provided outside of (e.g., as a supplement to) a full Internet banking UI. For example, the desktop UI may be configured to reside and/or appear on a foreground location at the client 40, such as on a desktop or home screen. In this way, the desktop UI may be viewed by the customer, for example, while the customer performs other activities on the client device.

The desktop UI comprises a graphical balance indicator comprising first and second segments. The relative areas of the first and second segments may indicate a relationship between the balances of the first and second financial accounts. The balance indicator may also comprise a scheduled payments indicator. The scheduled payments indicator may be positioned relative to the first segment so as to indicate a portion of the balance of the first financial account necessary to meet a balance of scheduled payments. The balance indicator may provide a graphical indication of the balances of the first and second financial accounts (e.g., based on the relative sizes of the first and second segments). The balance indicator may also provide numerical indications of the balances of the first and second accounts. In various embodiments, however, the balance indicator has a default state where only graphical indications of balances are shown (e.g., no numerical indications are shown). In this way, the customer may receive a graphical balance indication that makes sense to the customer, who has some knowledge of the balances, without displaying confidential financial information that is easily understood by a third party. In various embodiments, the customer may cause the balance indicator to enter a second state showing a textual and/or numerical balance of one or both of the financial accounts. The customer may transition the balance indicator to the second state, for example, by selecting the balance indicator including, for example, a button or menu thereof.

In various embodiments, the desktop UI provides the customer with alerts upon the occurrence of activity on one or both of the financial accounts. Example activities include deposits, withdrawals, etc. Upon occurrence of an activity, the desktop UI may provide an alert in any suitable manner. The alert includes information about the activity including, for example, the type of activity (e.g., deposit, withdrawal), the amount of transaction, etc. Alerts may be graphically displayed to the customer, for example, utilizing dedicated desktop fields and/or through an operating system of the customer host computer device.

The desktop UI may be implemented by an interface application that may be executed by the customer's client computing device. The interface application may be in communication with a host system operated by the financial institution holding the first and second accounts, another financial institution, a third-party service, etc. The interface application may receive financial data regarding the customer including, for example, balances of the first and second financial accounts, a balance of scheduled payments, etc. The interface application may also generate and display the desktop UI utilizing the received financial data regarding the customer.

In some embodiments, the interface application is configured to launch and provide the desktop interface automatically upon start-up of the customer's client computing device. For example, upon a first start-up, the customer may provide authentication information (e.g., a user name, password, personal identification number (PIN), etc.). The customer's client computing device may store the authentication information locally, and transmit the same to the host system to authenticate the customer. Upon subsequent start-ups of the customer's client computing device, the interface application may launch automatically. If less than a threshold time has passed since the last time that the customer was successfully authenticated to the host system, the interface application may recall the authentication information from memory and provide the same to the host system to authenticate the customer and begin receiving financial data for providing the desktop interface.

In various embodiments, the desktop interface may include functionality for allowing the customer to access a full Internet banking UI hosted by and/or for the financial institution. For example, the desktop interface may include a hyperlink or other selectable option for launching the Internet banking UI. The Internet banking UI may provide additional functionality regarding the first and second financial accounts. For example, the Internet banking UI may allow the customer to transfer funds between the financial accounts, deposit funds to one or both of the financial accounts, receive statements of account activity, etc. In some embodiments, the desktop UI and the full Internet banking UI may be hosted by a common host system.

Before providing details of the desktop UI described above, a robust description is provided of an example environment for providing Internet banking products, such as the desktop and Internet banking UI's. For example, FIG. 1 is a block diagram illustrating one embodiment of an environment 5 for providing Internet banking products, such as the desktop UI and Internet banking UI, to a customer. The environment 5 comprises a host system 7 and one or more client computing devices 40 (hereinafter "clients"). The host system 7 may be implemented by and/or for a financial institution to provide Internet banking products to its customers. Each client 40 may be associated with a customer or customers of the financial institution. The host system 7 and clients 40 may be in communication with one another via a communications network 25. The communications network 25 may be and/or include any suitable type of wired and/or wireless, public and/or private data network suitable for enabling the exchange of information between the host system 7 and the client 40. For example, the network 25 may comprise a local area network (LAN), the Internet, etc. In some embodiments, the network 25 may comprise a mobile telecommunications network (e.g., a 3G network, a 4G network, etc.).

The host system 7 may be configured to provide Internet banking products to the clients 40 utilizing one or more user interfaces. A desktop UI 43 may provide basic account information such as, balance information, transaction and other alerts, etc., as described herein. The desktop UI 43 may be configured to appear at a foreground location of the client 40 such as, for example, on a desktop or home screen. For example, the client 40 may be configured to execute an operating system including and/or utilizing a desktop environment or similar interface. In various embodiments, a desktop environment comprises a graphical user interface that is provided to the user as a desktop or home screen. The desktop or home screen comprises various icons, windows, toolbars, folders, etc. that can be used to utilize various operating system features such as, managing files, launching applications, etc. The desktop or home screen can also comprise application interfaces, such as the desktop UI 43. Such application interfaces may appear in conjunction with other icons, windows toolbars, folders, etc. of the home screen or desktop. Examples of operating systems that incorporate and/or utilize a desktop environment include, most WINDOWS operating systems from MICROSOFT CORPORATION, most MAC OS operating systems from APPLE, INC., many LINUX-based operating systems available from various sources, as well as mobile operating systems such as IOS from APPLE, INC., WINDOWS MOBILE from MICROSOFT CORPORATION, ANDROID from GOOGLE, INC., etc.).

Figure 1A:
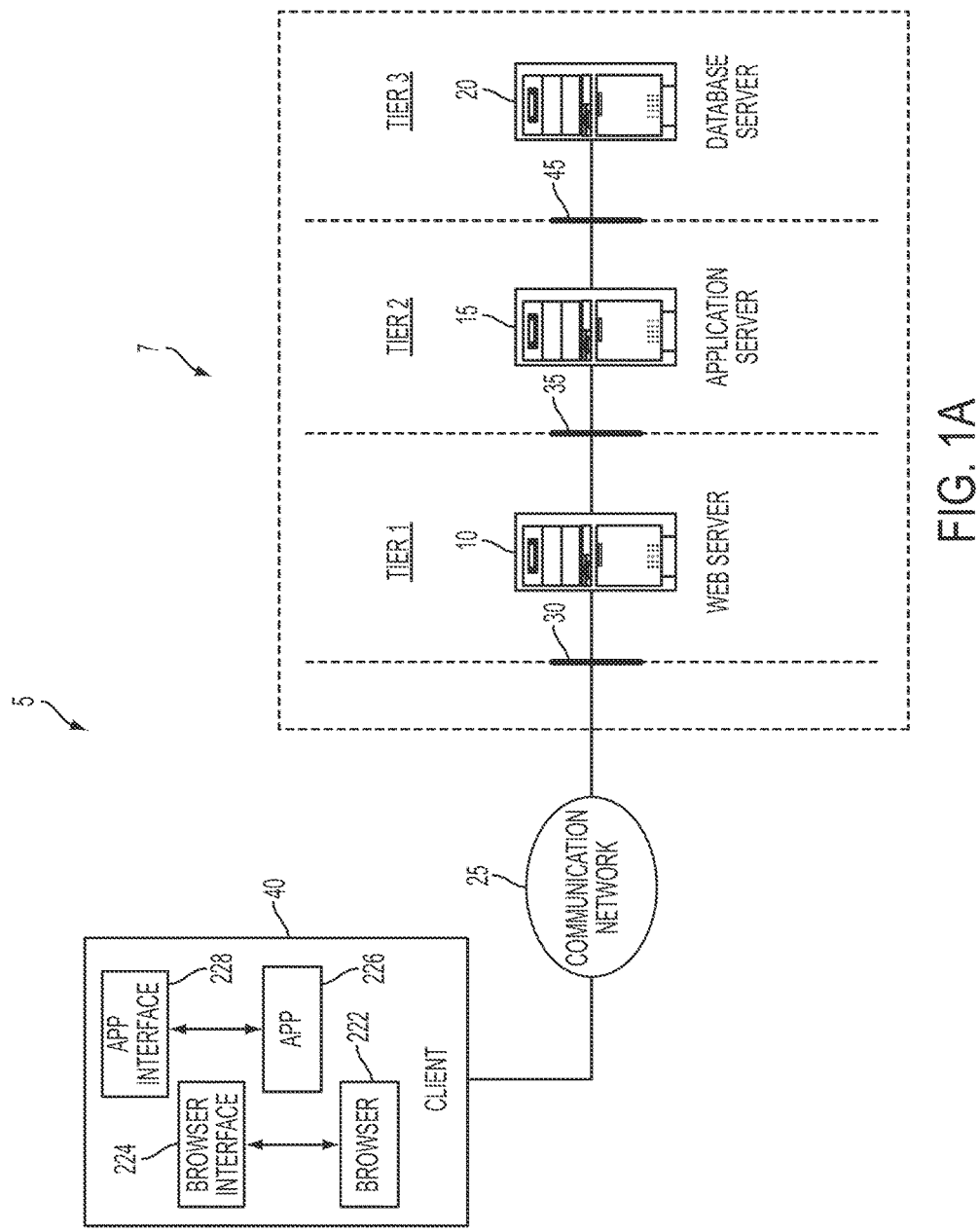
FIG. 1A is a block diagram illustrating one embodiment of the environment of FIG. 1 showing additional details of a client.

In some embodiments, the host system 7 may also be configured to serve an Internet banking user interface (Internet banking UI 42). The Internet banking UI 42 may be configured to provide clients 40 (and associated customers) with the ability to perform various banking functions including, for example, making balance inquiries, receiving account statements, depositing funds in an account, transferring funds between accounts, making online payments, etc. In various embodiments, the Internet banking UI 42 may be provided to the user via a browser executed by the client 40 (FIG. 1A). It will be appreciated that, in some embodiments, the Internet banking UI 42 may be provided by a separate host system (not shown) that may be implemented by the same party implementing the host system 7 or by another party.

The host system 7 may be constructed and arranged with any suitable architecture including any suitable combination of components. For example, the host system 7 may be implemented according to a cloud computing model and/or may provide the Internet banking products according to a software as a service (SaaS) model. The host system 7 may be implemented on a single server or, in some embodiments, may be implemented on multiple servers in a single geographic location or networked across multiple geographic locations. In various embodiments, the host system 7 may be arranged in a tiered network architecture and include a Web server 10, an application server 15 and a database server 20.

The Web server 10 corresponds to the first tier of the host system 7 and communicates with the communication network 25 and the application server 15 via a border firewall 30 and an application firewall 35, respectively. The Web server 10 is configured to accept requests from the clients 40 (e.g., a PC or other network-enabled device associated with a customer) via the communication network 25 and provide responses. The requests from and responses to the clients 40 may be formatted according to any suitable format or standard including, for example, hypertext transfer protocol (HTTP), hypertext mark-up language (HTML), extensible mark-up language (XML), extensible business reporting language (XBRL), etc. The responses may include data for populating and/or implementing various user interfaces in conjunction with the provision of Internet banking products. The data of the response may be formatted according to any suitable format or standard including, for example, HTTP, HTML, XML, XBRL, etc. In some embodiments, the responses may comprise static and/or dynamic HTML documents for providing the desktop UP 43 and/or the Internet banking UI 42 to the bank customers via the clients 40. The Web server 10 may further be configured to authenticate the customer's credentials before allowing access to the desktop UI 43, the Internet banking UI 42 and/or other banking resources. Such authentication may be performed, for example, using a user name and a password, a personal identification number (PIN), etc. . . . . .

A second tier of the host system 7 may comprise an application server 15. The application server 15 communicates with the Web server 10 and the data base server 20 via the application firewall 35 and an internal firewall 45, respectively. The application server 15 may host server-side Internet banking applications for executing the business logic associated with the Internet banking products and services. The application server 20 may receive customer-entered information from the desktop UI 43 and/or Internet banking UI 42 of the client 40 via the Web server 10. Such information may include, for example, customer authentication information such as a user name, password and/or personal identification number (PIN), requests to access particular banking products or services, etc. Based on the customer's identity and other information received from the client 40 via the Web server 10, the application server 15 may perform transactions (e.g., transfer funds between accounts, retrieve account balances, etc.) and generate corresponding informational content (e.g., transfer confirmations, account balance information, etc.). Such information may be communicated to the Web server 10 and subsequently presented to the customer using, for example, a dynamic Web page.

The third tier of the host system 7 may comprise a database server 20, which may communicate with the application server 15 via the internal firewall 45. The database server 20 may include one or more databases containing, for example, customer user names, passwords and PIN's, customer financial accounts and their respective balances, customer historical transaction information, and products and/or services (e.g., online bill pay) associated with each customer, as well as configuration information for each. Such information may be retrieved, processed and updated as needed by the application server 15 based on the particular Internet banking application(s) being used.

The clients 40, as discussed above, may include any network-enabled computing device such as, for example, a desktop computer, a laptop computer, an Internet or network-enabled mobile phone, a tablet computer, etc. Clients 40 may be configured to transmit and receive information via the communication network 25 using a wired or wireless connection. In some embodiments, the client 40 may execute a suitable browser software application (e.g., INTERNET EXPLORER, INTERNET EXPLORER MOBILE, FIREFOX, CHROME, BLAZER, etc.) for enabling the customer to display, enter and interact with information exchanged via the communication network 25. The client 40 may thus access and navigate static and/or dynamic HTML documents of the Internet banking UI 42.

FIG. 1A is a block diagram illustrating one embodiment of the environment 5 showing additional details of a client 40. For example, the client 40 may execute one or both of a browser 222 and an interface application 226. The browser 222 may operate, as described herein above, to receive, view, navigate and manipulate static and/or dynamic web page documents (e.g., HTML pages or documents) of the Internet banking UI 42, as described herein. For example, the browser 222 may implement a browser interface 224 for graphically presenting HTML and otherwise formatted pages to customers through the Internet banking UI 42. Various Internet banking products may be provided to the customer via the pages. The interface application 226 may implement user interfaces directly on at a foreground location of the client 40 such as, for example, a desktop, home page, etc. For example, the interface application 226 may implement the application interface 228 for graphically presenting data to customers through the desktop UI 43. In some embodiments, the interface application 226 may be in direct communication with the host system 7 independent of the browser 222. The interface application 226 may be implemented in any suitable fashion and according to any suitable computing language or standard (e.g., ADOBE FLASH, ADOBE FLEX, HTML, AJAX, etc.). In some embodiments, the interface application 226 may be configured for execution in conjunction with a cross-platform runtime environment such as ADOBE AIR.

Figure 2:
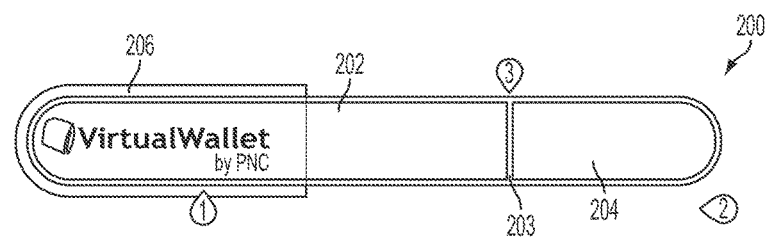
FIG. 2 is a diagram of one embodiment of a desktop user interface (UI) comprising a balance indicator.
Figure 17:
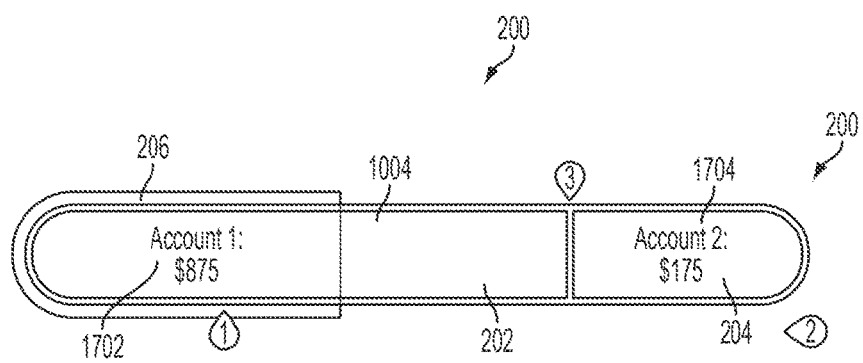
FIG. 17 is a screen shot showing one embodiment of the balance indicator of FIG. 2 in a second state showing numerical balances of the first and second financial accounts.

FIG. 2 is a diagram of one embodiment of the desktop UI 43 comprising a balance indicator 200. The balance indicator 200 may be provided to a customer through a client 40. The balance indicator 200 may appear on a foreground location at the client 40, such as a desktop or home screen. The balance indicator 200 comprises a first segment 202 and a second segment 204. The area of the first segment 202 corresponds to (e.g., is proportional to) a balance of a first financial account of the customer. The area of the second segment 204 corresponds to (e.g., is proportional to) a balance of a second financial account of the customer. In various embodiments, the balance indicator 200 has a default state, as shown in FIG. 2, where balances of the first and second financial accounts are indicated graphically (e.g., by the relative areas of the first and second segments 202, 204). In some embodiments, the balance indicator 200 also has a second state where textual or numerical indications of the balances are displayed. FIG. 17, described in more detail below, illustrates an example of such a second state.

The first and second financial accounts may be any suitable type of financial accounts held by the customer with the financial institution. For example, in some embodiments, the first financial account may be a transactional or "available" account such as a checking or demand-deposit account or any type of account from which the customer can draw using, for example, a check or an electronic funds transfer. The second financial account may be, for example, a "reserve" account such as, for example, a savings account, money market account, certificate of deposit, etc. In various embodiments, the second financial account may pay a higher rate of interest than the first financial account.

In various embodiments, and as illustrated by FIG. 2, the total area of the balance indicator 200 may remain constant. Accordingly, the balances of the first and second financial accounts may be indicated by relative areas of the segments 202, 204. Also, in some embodiments, one dimension of the balance indicator 200 may be held constant. For example, in the embodiment illustrated by FIG. 2, the height of the balance indicator 200 is constant. Therefore, the relative areas of the respective segments 202, 204 may be expressed as relative lengths. The first and second segments 202, 204 may be distinguishable relative to one another in any suitable manner. For example, in some embodiments, the segments 202, 204 may have distinct colors, shading and/or cross-hatching. In addition, or instead, the balance indicator 200 may comprise a divider 203 positioned between the segments 202, 204. In various embodiments, described herein, the customer may bring about a transfer of funds between the first and second financial accounts by selecting and moving the divider 203 between the first and second segments 202, 204.

In some embodiments, the balance indicator 200 may also comprise a scheduled payments indicator 206. The scheduled payments indicator 206 may indicate a portion of the first and/or second financial account balances necessary to meet a balance of scheduled payments for the customer. The balance of scheduled payments may reflect bills or other planned withdrawals from one or both of the financial accounts. The bills and other planned withdrawals (e.g., bill payment information) may be received by the host system 7 from the customer, for example, via the Internet banking interface 42 described in more detail below. In various embodiments, the balance of scheduled payments, and therefore the scheduled payments indicator 206, may indicate only near-term payments (e.g., payments due before the next scheduled pay day, payments due within a set time period measured from the current date, etc.). The balance indicator 200 may be implemented using, for example, JavaScript or any other suitable programming tool for generating interactive graphical elements.

The scheduled payments indicator 206 may be positioned relative to the first segment 202 so as to indicate a portion of the balance of the first segment necessary to meet the balance of scheduled payments. For example, and as shown in FIG. 2, the scheduled payments indicator 202 may be a bar element placed in proximity to the first and/or second segments 202, 204 and having a length determined by the balance of scheduled payments. The position of the bar relative to the first segment 202 may indicate the portion of the first financial account balance necessary to meet the balance of scheduled payments. In various embodiments, if the balance of scheduled payments is greater than the balance of the first financial account, then the scheduled payments indicator 206 may extend beyond the first segment and overlap the second segment 204. If the balance of scheduled payments is greater than the combined balance of the first and second financial accounts, then the scheduled payments indicator 206 may extend beyond both of the first and second segments 202, 204. In various embodiments, the first and/or second segments 202, 204 may be at least partially transparent such that all or a portion of the scheduled payments indicator 206 is visible through the first and/or second segment 202, 204.

Figure 3:
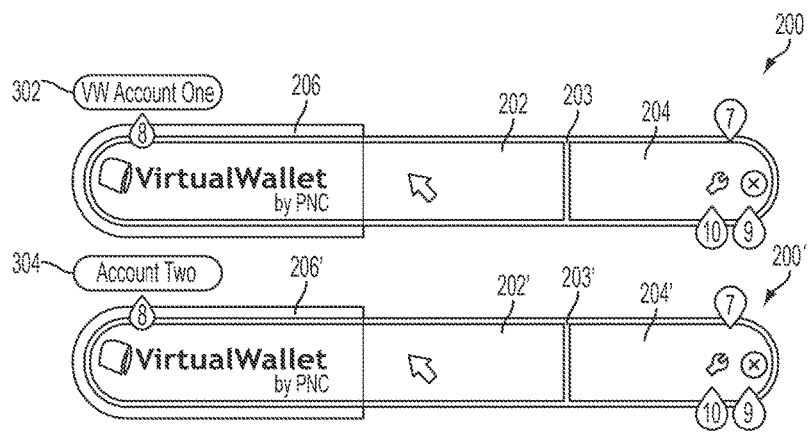
FIG. 3 illustrates a diagram of one embodiment of the desktop UI of FIG. 2 comprising multiple balance indicators.

In various embodiments, the desktop interface 43 may comprise more than one balance indicator, with each separate balance indicator corresponding to a different set of financial accounts. For example, FIG. 3 illustrates a diagram of one embodiment of the desktop UI comprising multiple balance indicators 200, 200'. The balance indicator 200 may be similar to the description above. The additional balance indicator 200' may comprise first and second segments 202', 204' and a scheduled payments indicator 206' similar to those of the balance indicator 200. In various embodiments, however, the balance indicator 200' may relate to third and fourth financial accounts of the client. The third and fourth financial accounts of the client may be held at the same financial institution as the first and second financial accounts or at a different institution. For example, the client 40 (e.g., the interface app 206 of the client 40) may be in communication with multiple host systems, such as the system 7, with each host system providing data for populating one of the balance indicators 200, 200'. Also, in some embodiments, information for populating all of the balance indicators 200, 200' may be received from a single host system 7.

Figure 4:
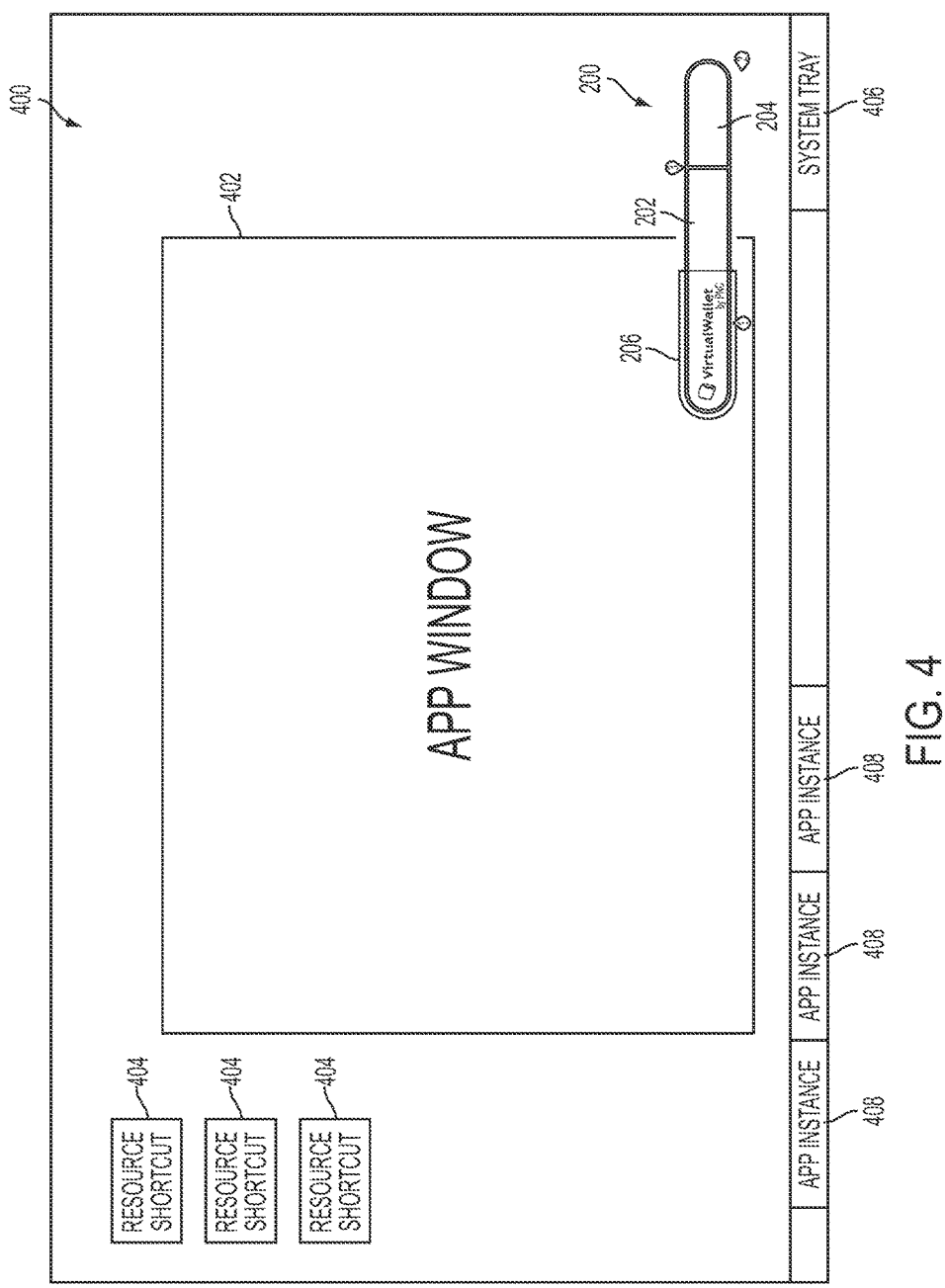
FIG. 4 is a screen shot showing one embodiment of a desktop of a client with the balance indicator of the desktop UI of FIG. 2 shown thereon.

FIG. 4 is a diagram of one embodiment of a desktop 400 of a client with the balance indicator 200 of the desktop UI 43 shown thereon. Although the desktop 400 is referred to herein as a "desktop," it will be appreciated that various aspects of the desktop 400 described herein apply equally to a home screen or similar screen or window. The desktop 400 may be provided to the customer by the client 40, for example, as an interface for accessing functionality of the client 40 including, for example, functionality for implementing the desktop UI 43, the Internet banking UI 42, and various other applications. The desktop 400 comprises a plurality of selectable resource icons 404. The resource icons 404, when selected by the customer or other user of the client 40, may cause the client 40 to access the corresponding resource. Example resources may include applications (executed by the client 40), documents and files (opened by applications executed by the client 40), folders, etc. Example applications may include, for example, word processing applications, e-mail applications, spreadsheet applications, calendar applications, browsers, etc. In some embodiments of the desktop 400, active applications are listed at one or more application tiles 408. Some active applications may have an application window 402 for allowing the customer or other user of the client 40 to access application functionality. For example, a word processing application may allow the customer or other user of the client 40 to enter and/or modify text in the application window 402. Also, in some embodiments, the window 402 may correspond to the browser interface 224 and may be for displaying static and/or dynamic pages formatted according to HTML or any other suitable standard. In some embodiments, the application window 402 may be maximized to cover all or a large portion of the desktop 402. In various embodiments, the desktop 400 also comprises a system tray or dock menu 406. The system tray or dock menu 406 may indicate various applications, services and/or utilities being executed by the client 40. Also, in some embodiments, the system tray 406 may indicate alerts (e.g., system alerts, alerts from applications and/or alerts from the desktop UI 43, as described herein).

The balance indicator 200 of the desktop UI 43 is shown in FIG. 4 on the desktop 400. In various embodiments, and as described in more detail herein, the balance indicator 200 may be positioned to remain on top of some or all of the active application windows, such as the application window 402. For example, the balance indicator 200 is shown positioned on top of the application window 402. Although the balance indicator 200 is shown in the bottom right of the desktop 400, it may be positioned at any suitable location on the desktop 400 (e.g., subject to desktop and/or operating system constraints). Also, the desktop 400 is just one example of a foreground location where the balance indicator 200 may be placed. The form of any particular foreground location (e.g., desktop, home screen, etc.) may be determined, for example, based on the operating system executed by a client 40. The desktop 400, for example, may be a personal computer-oriented desktop such as one implemented by a WINDOWS operating system from MICROSOFT CORPORATION, or a MAC OS operating system from APPLE, INC. It will be appreciated that when other operating systems and other styles of operating systems are used, desktops may take different forms according to different arrangements. For example, when the client 40 is a mobile computing device, it may have a foreground including one or more home screens (e.g., according to a mobile operating system such as IOS from APPLE, INC., WINDOWS MOBILE, from MICROSOFT CORPORATION, ANDROID from GOOGLE, INC., etc.).

Figure 5:
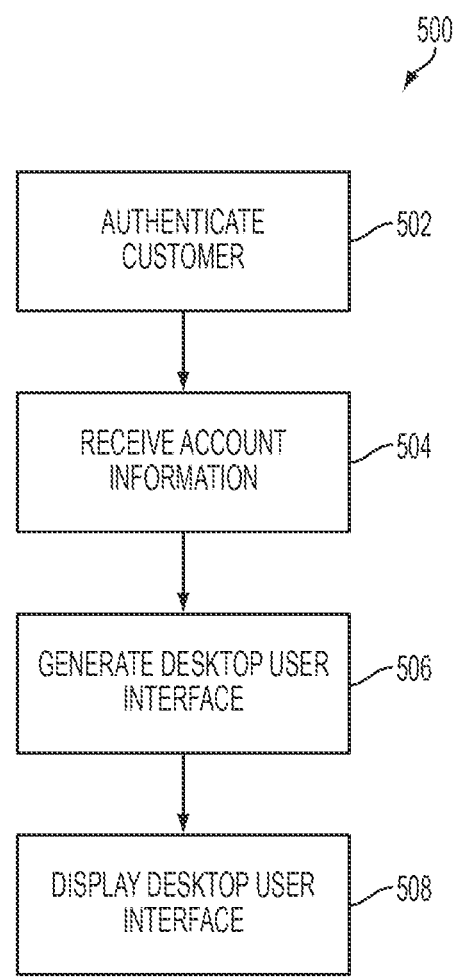
FIG. 5 is a flow chart showing one embodiment of a process flow for implementing the desktop UI of FIG. 2.

FIG. 5 is a flow chart showing one embodiment of a process flow 500 for implementing the desktop UI' 43. The process flow 500 may be executed, for example, by the client 40 upon execution of the interface application 226. The interface application 226 may be launched in response to a launch request by the customer or other user of the client 40 (e.g., by selecting a resource icon 404) or, in various embodiments, may be launched automatically upon start-up of the client 40. At 502, the client 40 may authenticate the customer. Authenticating the customer may comprise prompting the customer for authentication information (e.g., a user name, password, PIN, etc.) and providing the authentication information to the host system 7. In some embodiments, the customer's authentication information may be stored at the client 40 (e.g., on a hard drive or other non-volatile storage). Accordingly, in some embodiments, authenticating the customer may comprise retrieving stored authentication information and providing the same to the host system 7. Additional process flows for authenticating the customer are described in more detail herein below.

After authentication, the client 40 may, at 504, receive account information relating to the customer from the host system 7. The account information may comprise, in various embodiments, a balance of the first financial account, a balance of the second financial account and a balance of scheduled payments, for example, as described herein. The account information may be received in any suitable form. For example, the account information may be received as raw data. Also, in some embodiments, the account information may be received as a pre-packaged interface (e.g., a document according to HTML or any other suitable standard). At 506, the client 40 may generate the desktop UI 43 in view of the received account information. For example, the desktop interface 43 may be used to form and/or populate at least one balance indicator 200 described herein. In some embodiments where the account information is received as a pre-packaged interface, the client 40 may omit 506. At 508, the client 40 may display the desktop UI 43, including the at least one balance indicator 200, to the customer, for example, on a screen of the client 40.

Figure 6:
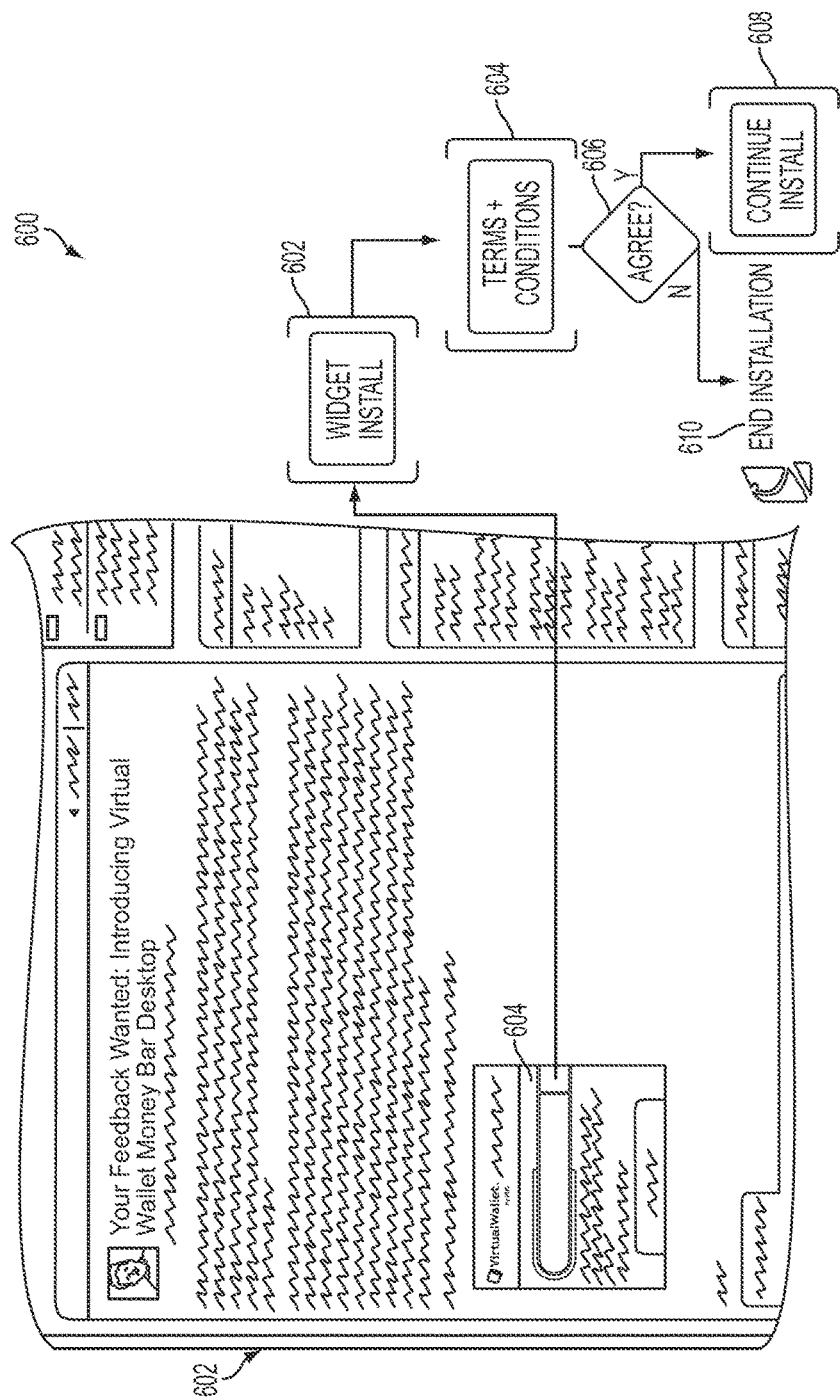
FIG. 6 is a workflow showing one embodiment of a process flow and screen shots for obtaining the desktop UI 43 on a client 40.

The customer may obtain the desktop UI 43 in any suitable manner. For example, FIG. 6 is a workflow showing one embodiment of a process flow 600 and screen shots for obtaining the desktop UI 43 on a client 40. For example, the customer may initiate the process of obtaining the desktop UI 43 by visiting a page 602 comprising a download link 604. The page 602 may be formatted according to any suitable format (e.g., HTML) and may be served to the client 40 by the host system 7 and/or by another suitable system. In various embodiments, the page 602 may be served to the client 40 via a browser application such as browser 222. When the customer selects the download link 604 from the page 602, the client 40 and host system 7 may establish a connection and resources for implementing the interface application 226 may be downloaded to the client 40 (e.g., from the host system 7 or another suitable location). At 602, the client 40 may install the interface application 226. In various embodiments, the customer may be required to assent to various terms and conditions of use before installation of the application 226 may be completed. At 604, the host 40 may display the terms and conditions to the customer. Provided that the customer agrees or assents to the terms and conditions at 606, the installation of the interface application 226 may continue (and ultimately be completed) at 608. If the customer does not agree or assent to the terms and conditions, the installation may be terminated at 610.

Figure 7:
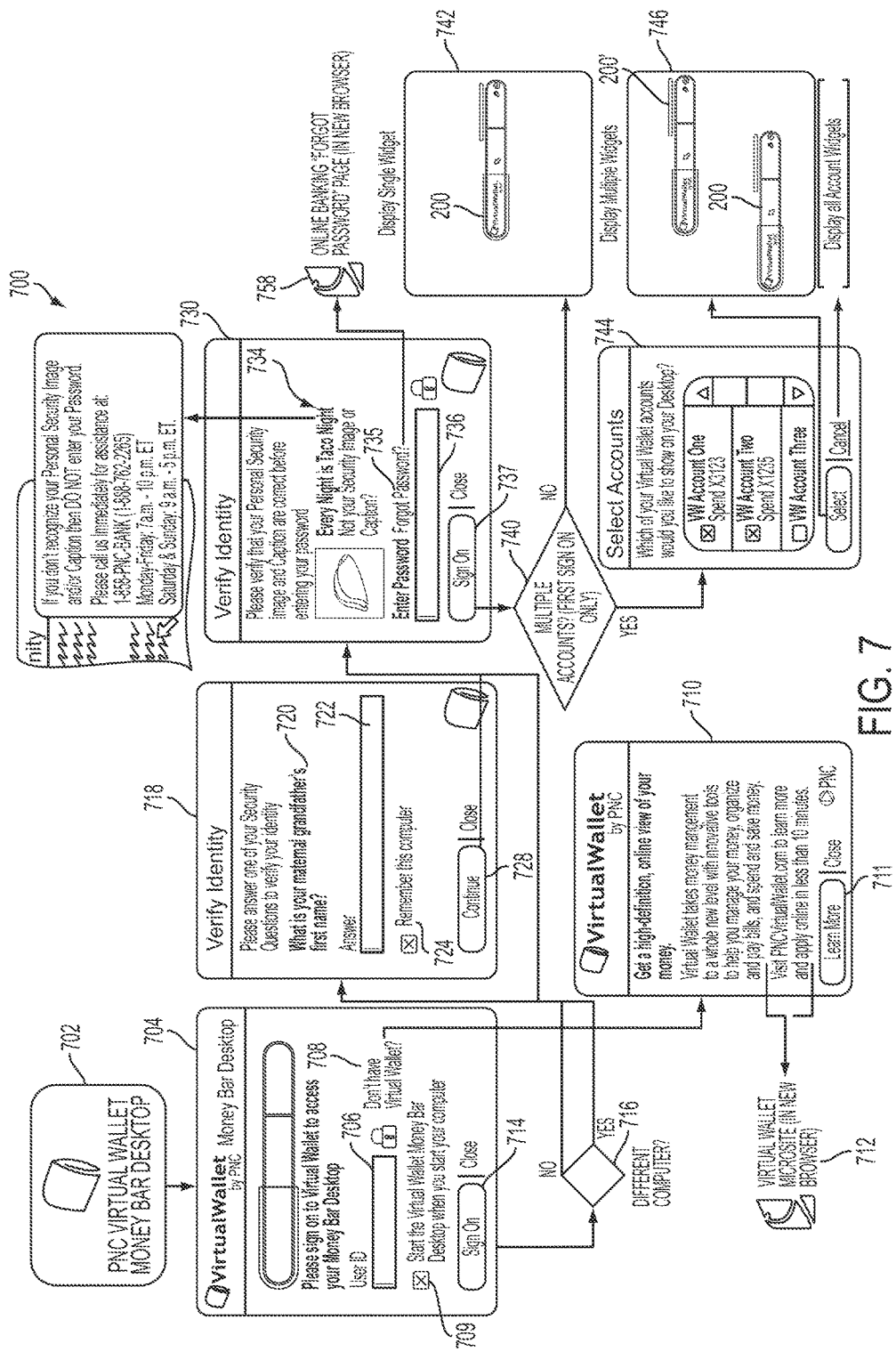
FIG. 7 is a workflow showing one example embodiment of a process flow and screen shots for receiving authentication information from the customer.

Upon installation of the interface application 226, the customer may access the desktop UI 43 when the interface application 226 is launched. The interface application 226 may be launched in response to a request from the customer or automatically, for example, on start-up of the client 40. Once the interface application 226 is launched, it may authenticate the customer to the host system 7 by providing authentication information. The authentication information, as described above, may be received from the customer and/or retrieved from a hard drive or other non-volatile storage of the client 40. FIG. 7 is a workflow showing one example embodiment of a process flow 700 and screen shots for receiving authentication information from the customer. At 702, the client 40 may launch the interface application 226. Upon launch, the interface application 226 may display a sign-on window 704. For example, the sign-on window 704 may be displayed on a desktop of the client 40, such as the desktop 400 described herein above. The sign-on window may comprise a User ID field 706 where the customer may enter a user identification. A button 708 may be selected, for example, by a user who is not a customer of the financial institution or is not registered to utilize one or both of the Internet baking UI 42 and the desktop UI 43. Upon selection of the button 708, the client 40 may display a window 710 comprising a link 711 for accessing a site or page that may allow the customer to register for one or both of the UI's 42, 43.

Upon entering a user identification in field 706, the user may select, at field 709, whether to configure the interface application 226 to execute automatically upon start-up of the client 40. Selecting the Sign-On button 714 may cause the interface application 226 to determine, at 716, whether the customer has previously stored security bypass data at the client 40. Whether or not the customer has stored security bypass data at the client 40 may determine the degree of security review to which the customer is subjected. For example, if the customer has not stored security bypass data at 716, the client 40 may display a security question window 718. The security question window 718 may comprise a security question 720 (e.g., a question that only the customer should know) and an answer field 722 in which the customer may enter an answer to the security question 720. In some embodiments, the customer may also select a "Remember this computer" field 724 to store security bypass data at the client 40. The security bypass information may be stored, for example, at a non-volatile storage device of the client 40 at any suitable physical or logical location. Upon storing the security bypass data, the customer may not be shown the security question window 718 upon subsequent launches of the interface application 226.

Upon the customer selecting the Continue button 728 after having provided a correct answer to the security question 720 and/or if it is determined that the customer has previously stored security bypass information on the client 40 at 716, the customer may be shown an password prompt window 730. The password prompt window 730 may provide a password field 736 into which the customer may enter a password for accessing the desktop UI 43. In various embodiments, the password prompt window 730 (or a different window) comprises a security image 732 and caption 734. The customer may further verify the correctness of the log-in by verifying that the security image 732 matches the security caption 734. In some embodiments, the customer may have previously selected the security image 723 and caption 734. In the event that a customer has forgotten his or her password, a Forgot Password button 735 may be selected, causing the host 40 to launch a Forgot Password page 738, which may operate in any suitable fashion to verify the identity of the customer and provide either the forgotten password or a new password for the customer's account.

Upon receiving a correct password and a selection of the Sign On button 737, the host 40 may prompt the customer to indicate whether to show one or multiple balance indicators 200. If multiple balance indicators are to be shown, the host 40 may display an account selection window 744. The account selection window 744 may list multiple accounts (or account pairs) of the customer. The customer may select one or more accounts or account pairs from the window 744. Upon receiving the customer's selection, the client 40 may display the appropriate balance indicators 200, 200', as shown at 746. If only one balance indicator is to be shown, then the client 40 may display the balance indicator 200, as shown at 742.

Figure 8:
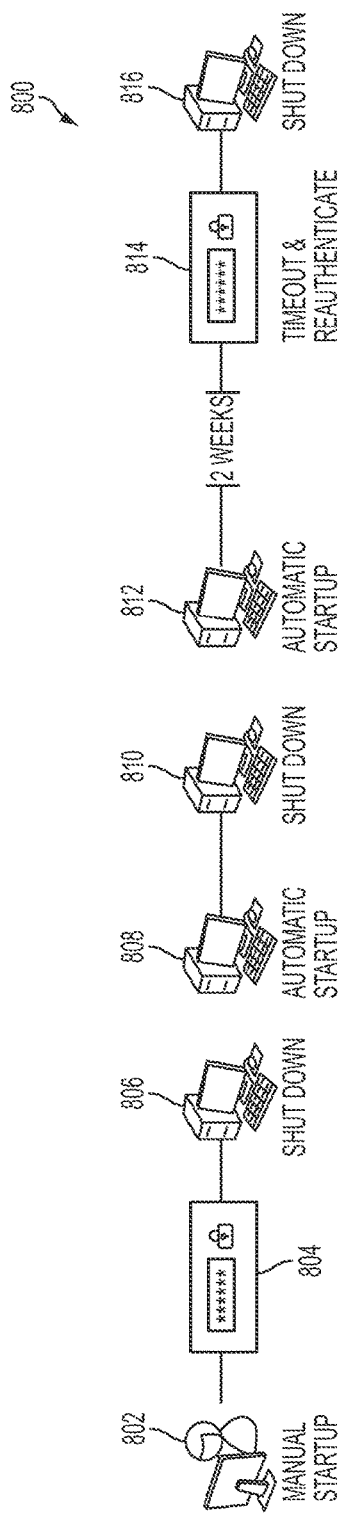
FIG. 8 is a flowchart illustrating one embodiment of a process flow for implementing the desktop UI of FIG. 2 with saved authentication information from a customer.

FIG. 8 is a flowchart illustrating one embodiment of a process flow 800 for implementing the desktop UI 43 with saved authentication information from a customer. At 802, the customer may manually launch the interface application 226. Upon launch, the interface application 226 may cause the client 40 to receive authentication information from the customer and provide the authentication information to the host system 7, for example, as described with respect to FIG. 7. In some cases, the customer may indicate that authentication information should be stored at the client 40 (e.g., at a non-volatile storage location). For example, referring to FIG. 7, the customer may select field 709. Referring back to the process flow 800, at 806, the customer may shut down the desktop UI 43, for example, by shutting down the client 40, terminating the interface application 226, etc.

At 808, the interface application 226 may start-up the desktop UI 43 automatically. For example, the interface application may launch or start-up the desktop UI 43 automatically in response to an external event (e.g., start-up of the client device 40, the expiration of a timer, etc.). The automatic start-up of the desktop UI 43 may utilize saved authentication information and, therefore, may not require additional input from the user. At 810, the interface application 226 may shut-down the desktop UI 43 (e.g., upon shut-down of the client 40, upon expiration of a timer, etc.). At 812, the desktop UI 43 may be started-up again, as described at 808. Upon the elapsing of two weeks from the start-up, the interface application 226 may require the customer to re-authenticate him or herself at 814. Re-authentication may be performed, for example, in a manner similar to the original authentication as described above with respect to FIG. 7. The desktop UI 43 may be shut down at 816, for example, in a manner similar to that described above with respect to 810.

Figure 9:
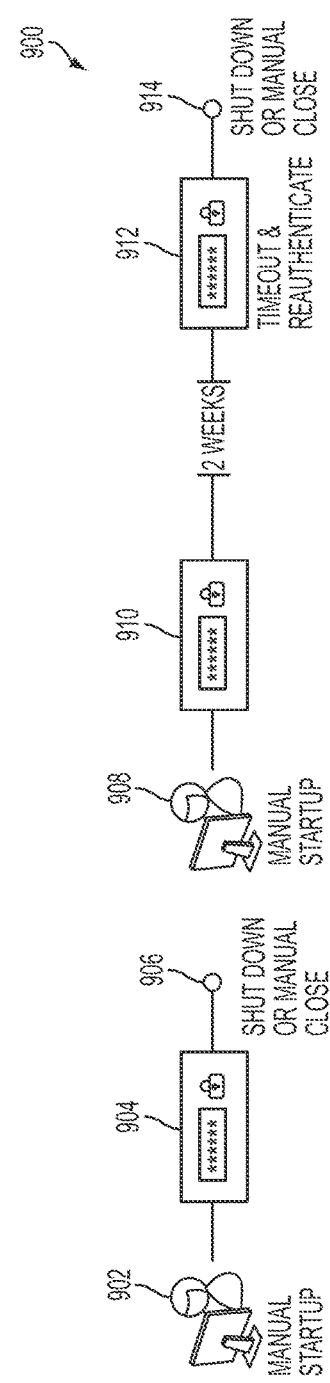
FIG. 9 is a flowchart illustrating one embodiment of a process flow for implementing the desktop UI of FIG. 2 without saved authentication information from the customer.

FIG. 9 is a flowchart illustrating one embodiment of a process flow 900 for implementing the desktop UI 43 without saved authentication information from the customer.

For example, the customer may not have selected the box 724 during authentication (FIG. 7). At 902, the customer may manually launch the desktop UI 43 (e.g., by launching the interface application 226). Upon launch, at 904, the interface application 226 may cause the client 40 to receive authentication information from the customer and provide the authentication information to the host system 7, for example, as described with respect to FIG. 7. At 906, the client 40 may shut down and/or the customer may manually close the desktop UI 43 and/or interface application 226. Action 908 represents a subsequent start-up. As no authentication information is stored at the client 40 in this example, the customer is re-prompted for authentication information at 910 before the desktop UI 43 is launched. If two weeks elapse before the desktop UI 43 is shut-down, the customer may be re-prompted for authentication information at 912. The desktop UI 43. (and interface application 226) may be shut down at 914.

Figure 10:
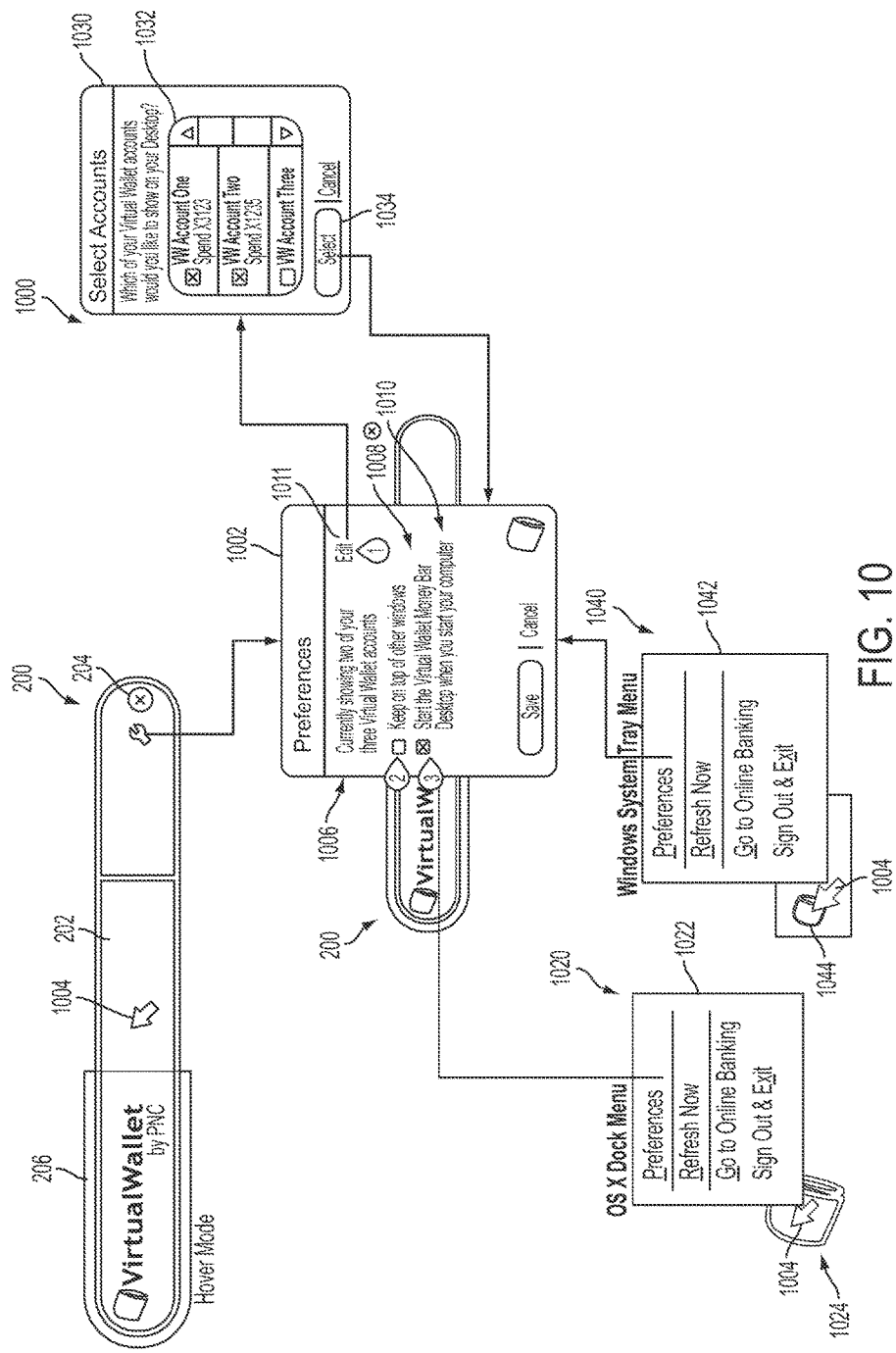
FIG. 10 is a work flow showing one embodiment of a process flow for customizing aspects of the desktop UI of FIG. 2.

In various embodiments, the customer may configure the interface application 226 to customize various aspects of the desktop UI 43. FIG. 10 is a work flow showing one embodiment of a process flow 1000 for customizing aspects of the desktop UI 43. A Preferences window 1002 may be displayed to the customer, for example, as an application window 402 on the desktop 400 of FIG. 4. The customer may enter preferences into the Preferences window 1002 to customize aspects of the desktop UI 43. The Preferences window 1002 may be displayed at any location on a screen of the client 40. For example, as illustrated in the example of FIG. 10, the Preferences window 1002 is displayed over the balance indicator 200. The example Preferences window 1002 illustrated in FIG. 10 comprises a status field 1006 listing the number of accounts having currently displayed balance indicators 200. (E.g. FIG. 3 shows one embodiment of the desktop UI 43 showing multiple balance indicators 200.) In the example of FIG. 10, the status field 1006 indicates that the customer has three financial accounts or sets of financial accounts and that two of them are currently illustrated with balance indicators 200. In some embodiments, the customer may select an Edit button 1011 to launch a Select Accounts field 1030. At the Select Accounts field 1030, the customer may be shown a list 1032 of all of the financial accounts and/or account pairs that may be the subject of a balance indicator 200. The customer may select the account or account pairs to be included with a balance indicator 200. Actuating the Select button 1034 may cause the interface application 226 to update the desktop UI 43 to display balance indicators 200 for the selected accounts or account pairs.

The Preferences window 1002 may also comprise a placement box 1008. The placement box 1008 may allow the customer to choose whether the desktop UI 43 (e.g., the various balance indicators 200) are displayed on top of other windows (e.g., on a desktop of the client 40, such as the desktop 400). For example, selecting the placement box 1008 may cause the desktop UI 43 to appear over any other windows that may be displayed by the client 40. A start box 1010 may allow the customer to choose whether the desktop UI 43 starts up automatically upon start-up of the client 40. Upon automatic starts, the interface application 226 may launch the desktop UI 43 automatically (e.g., if the customer has stored authentication information at the client 40) or may prompt the customer for authentication information.

The customer may launch the Preferences window 1002 (e.g., cause the Preferences window 1002 to appear at the client 40) in any suitable manner. In some embodiments, the customer may launch the Preferences window 1002 by hovering a cursor 1004 over the balance indicator 200, as shown in FIG. 10. Also, in some embodiments, the customer may launch the Preferences window 1002 utilizing an operating system tool such as, for example, a dock menu in MAC OS operating systems from APPLE, INC., a system tray in WINDOWS operating systems from MICROSOFT, etc. Reference number 1020 is an example showing how the Preferences window 1002 may be launched from the dock menu of a client 40 executing a MAC OS operating system. For example, an icon 1024 corresponding to the desktop UI 43 may be present in a dock menu of the client 40. The dock menu, and icon 1024, may be positioned at any suitable location on a screen of the client 40. For example, the dock menu and icon 1024 may be positioned at a location similar to that of the system tray or dock menu 406 of FIG. 4. Upon selection of the icon 1024 (e.g., with a pointing device utilizing the cursor 1004), a menu 1022 may be displayed. The menu 1022 may include a Preferences entry that, when selected by the customer, launches the Preferences window 1002. The menu 1022 may also include various other entries for configuring the desktop UI 43. In some embodiments, the menu 1022 comprises a Refresh Now entry that, when selected by the customer, may cause any balance indicators 200 being displayed to the customer to be updated to reflect current transactions. A Go to Online Banking entry, when selected by the user, may cause the client 40 to launch a full Internet banking UI 42 (e.g., via browser 222 as described herein). A Sign Out and Exit entry, when selected by the customer, may terminate the desktop interface 43 (e.g., by ceasing execution of the interface application 226). Reference number 1040 is an example showing how the Preferences window 1002 may be launched from the system tray of a client 40 executing a WINDOWS operating system. In various embodiments, an icon 1044 may appear in the system tray of the client 40. The system tray, for example, may be displayed at a location similar to that of the dock menu/system tray 406 shown in FIG. 4. The icon 1044 may operate in a manner similar to that of the icon 1024 described above. For example, the customer may select the icon 1044 to launch a menu 1042. The menu 1042 may have entries similar to that of the menu 1042 described herein above.

Figure 11:
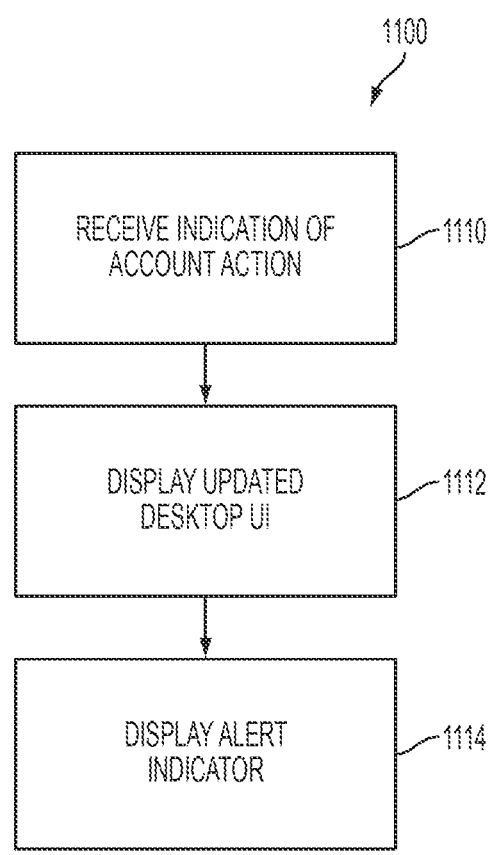
FIG. 11 is a flow chart illustrating one embodiment of a process flow for displaying an alert indicator in response to receiving an account event.

In various embodiments, the desktop UI 43 may display alert indicators upon the occurrence of an event related to the financial account or accounts indicated by the UI 43. FIG. 11 is a flow chart illustrating one embodiment of a process flow 1100 for displaying an alert indicator in response to receiving an account event. The process flow 1100 may be executed by any combination of the client 40 (e.g., under the direction of the interface application 406) and the host system 7. At 1110, the client 40 may receive an indication of an account event. The account event may be any suitable event related to a financial account that is the subject of the desktop UI 43. Examples of account events include deposits, withdrawals, transfers and any other transactions that bring about a change in the balance of at least one of the financial accounts that is the subject of the desktop UI 43. Also, in some embodiments, account events include projection based account warnings. For example, the host system 7 may track scheduled deposits and withdrawals from the financial accounts that are the subject of the desktop UI 43. When the scheduled deposits and/or withdrawals indicate that the projected balance of one or more of the financial accounts will drop below a threshold amount, the host system 7 may generate a projection based account warning. Examples of projection based account warnings are described, for example, in commonly owned U.S. patent application Ser.

No. 12/367,616 filed on Feb. 9, 2009 and entitled "SYSTEMS AND METHODS FOR ENABLING FINANCIAL SAVINGS" and U.S. patent application Ser. No. 14/367,605 also filed on Feb. 9, 2009 and entitled "SYSTEMS AND METHODS FOR SCHEDULING AND TRACKING BANK ACCOUNT ACTIVITY," both of which are incorporated herein by reference in its entirety.

Referring back to FIG. 11, at 1112, the client 40 may display an updated desktop UI 43 indicating the account event. For example, if the account event is a deposit or withdrawal that changes the relative balances of the financial accounts indicated by first and second segments 202, 204 of a balance indicator 200, the affected balance indicator or indicators 200 may be refreshed to reflect the change. At 1114, the client 40 may display an alert indicator. The alert indicator may indicate the existence of the alert. In some embodiments, the alert indicator may provide information about the alert. Also, in some embodiments, the alert indicator may provide information about the alert (or additional information about the alert) upon prompting by the customer. In some embodiments, the updated desktop UI 43 and/or the alert indicator may be displayed to the customer in real-time (e.g., right after the client 40 receives the indication of the account event).

In some embodiments, the alert indicator is displayed in conjunction with the balance indicator 200 corresponding to the account or accounts that are the subject of the alert. For example, FIG. 12 is a screen shot showing one embodiment of the balance indicator 200 comprising an alert field 1200 displayed therewith. The alert field 1200 is shown above and to the right of the balance indicator 200, though it will be appreciated that the alert field 1200 may be displayed anywhere in the screen of the client 40. In some embodiments, the alert window 1200 comprises an alert summary field 1206 indicating information about the alert. The alert summary field 1206 may indicate a name and/or type of the alert. For example, in FIG. 12, the indicated alert is a deposit of the customer's salary from an employer. The alert field 1200 may also comprise a navigation tool 1204 and a close-out button 1202. The navigation tool 1204 may allow the customer to navigate between different alerts indicated by the field 1200. For example, when more than one alert is displayed by the alert field 1200, selecting the navigation tool 1204 may allow the customer to display summaries of different alerts at alert summary field 1206. Selecting the close-out button 1202 may cause the alert field 1200 to disappear from the screen of the client 40. For example, the customer may select the close-out button 1202 after having reviewed the alert or alerts indicated by the alert field 1200.

Figure 14A:
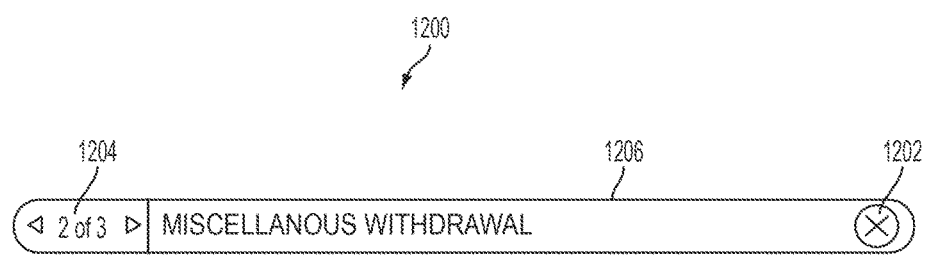
FIGS. 14A-14B are screen shots showing embodiments of the alert field of FIG. 12 showing summaries of different alert types.
Figure 14B:

FIG. 13 is a screen shot showing one embodiment of the balance indicator 200 and alert field 1200 with a different alert displayed. The summary field 1206, as shown in FIG. 13, indicates a projected based account warning (e.g., Danger Day approaching). FIGS. 14A-14B are screen shots showing embodiments of the alert field 1200 showing summaries of different alert types. In FIG. 14A, the alert summary field 1206 indicates a withdrawal. In FIG. 14B, the alert summary field indicates an online banking transfer. In some embodiments, the customer may receive additional information about an alert by selecting the alert field 1200 while it is displaying a summary of the alert.

Figure 15A:
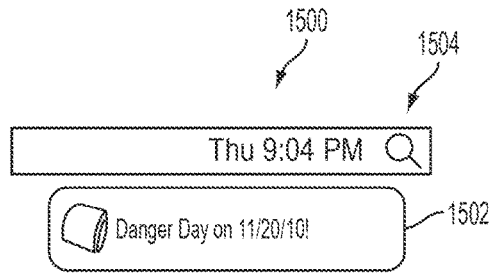
FIG. 15A is a screen shot showing one embodiment of a pop-up alert indicator.

In some embodiments, alert indications are provided by pop-up alert indicators that may be provided, for example, via an operating system of the client 40. Pop-up alert indicators may be provided in addition to or instead of the alert field 1200 described above. FIG. 15A is a screen shot showing one embodiment of a pop-up alert indicator 1500.

Figure 15B:
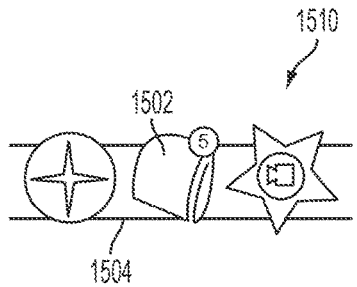
FIG. 15B is a screen shot showing one embodiment of an icon-based pop-up alert indicator environment.
Figure 15C:
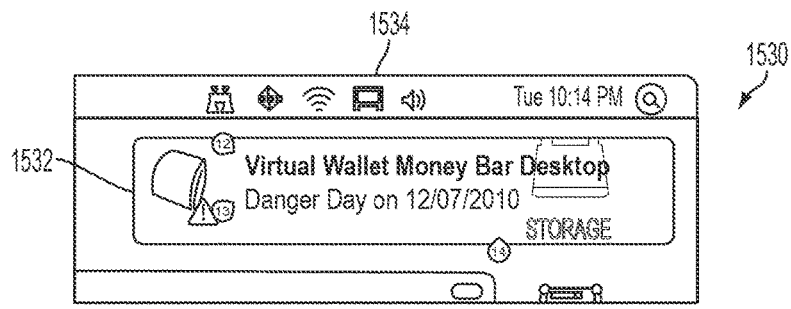
FIGS. 15C-15E illustrate embodiments of pop-up alert indicators implemented on different client operating systems.
Figure 15D:
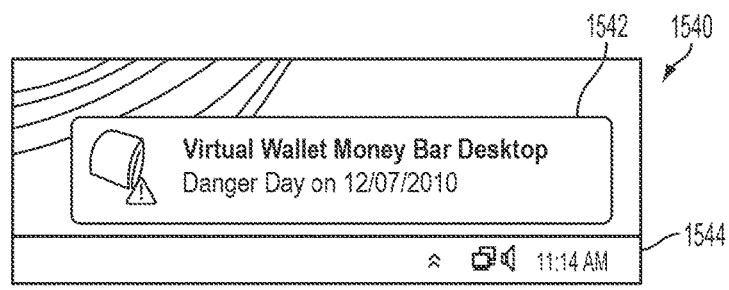
Figure 15E:
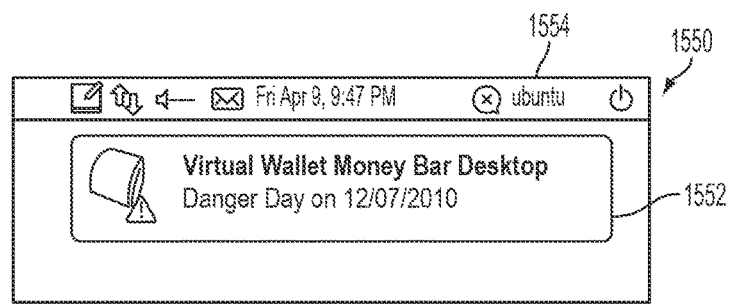

The display 1500 illustrates an example of the pop-up indicator screen 1502 that may appear on a desktop or other foreground location of the client 40. A dock menu or system tray is indicated by 1504. The pop-up indicator screen 1502 comprises a textual message providing a summary of the alert (e.g., danger day approaching on Nov. 20, 2010). FIG. 15B is a screen shot showing one embodiment of an icon-based pop-up alert indicator 1510. For example, a system tray or dock menu 1504 may comprise a desktop UI icon 1502. The icon 1502 may appear only when an alert is pending or, in some embodiments, may change color upon the occurrence of an alert. The customer may view the alert, for example, by selecting the icon 1502. Upon selection of the icon, the client 40 may cause an alert screen, such as the pop-up indicator 1502, to appear on the screen of the client 40. FIGS. 15C-15E illustrate embodiments of pop-up alert indicators implemented on different client operating systems. In FIG. 15C, the pop-up alert indicator 1530 is implemented on a client 40 executing a MAC OS operating system. A dock menu 1532 is shown in conjunction with a pop-up alert indicator screen 1532. In FIG. 15D, the pop-up alert indicator 1540 is implemented on a client 40 executing a WINDOWS operating system. A system tray 1544 is illustrated in conjunction with a pop-up alert indicator screen 1542. In FIG. 15E, the pop-up alert indicator 1540 is implemented on a client 40 executing an LINUX-based operating system. A system tray/dock menu 1554 is illustrated in conjunction with a pop-up alert indicator screen 1552. Although the pop-up alert indicator screens 1532, 1542, 1552 are shown in conjunction with respective system trays/dock menus 1534, 1544, 1554, it will be appreciated that the screens 1532, 1542, 1552 may appear anywhere on the desktop or other foreground location of the clients 40.

Figure 16:
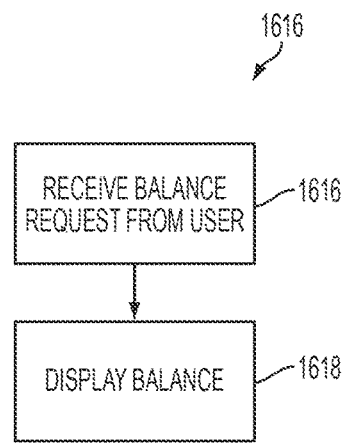
FIG. 16 is a flow chart illustrating one embodiment of a process flow for implementing a second state of the balance indicator of FIG. 2 showing a textual or numerical balance of a financial account or accounts.

As described above, the balance indicator 200 may have a default state where balances of the first and second financial accounts are indicated only in a graphical format (e.g., via the relative areas of the first and second segments 202, 204). In this way, the customer may receive a balance indication that makes sense to the customer, who has some knowledge of the balances, but may not effectively convey the customer's confidential financial information to casual observers of the client 40. As described above, in some embodiments of the desktop UI 43, the balance indicator(s) 200 have a second state displaying a textual or numerical indication of the balances of one or both of the financial accounts. The balance indicator(s) 200 may be transitioned to the second state in any suitable manner. For example, FIG. 16 is a flow chart illustrating one embodiment of a process flow 1600 for implementing a second state of the balance indicator 200 showing a textual or numerical balance of a financial account or accounts. The process flow 1600 may be executed by any combination of the client 40 (e.g., under the direction of the interface application 226) or the host system 7. At 1616, a balance request may be received from the customer. The balance request may be of any suitable form. For example, the customer may provide the balance request by selecting the balance indicator 200 with a cursor and/or by selecting a balance option from a menu (e.g., Preferences screen 1002 and/or menus 1020 or 1040). At 1618, the client 40 may display the numerical balances of the accounts. The numerical balances may be displayed, for example, for a limited amount of time or until the customer so indicates (e.g., by de-selecting the balance indicator). FIG. 17 is a screen shot showing one embodiment of the balance indicator 200 in a second state showing numerical balances of the first and second financial accounts. For example, the respective balances 1702, 1704 may be displayed over the corresponding segments 202, 204 of the balance indicator 200. The balance indicator 200 may be transitioned to the second state showing the numerical balances 1702, 1704, for example, when the customer moves the cursor 1004 over the balance indicator 200. In some embodiments, the customer may select the balance indicator 200 before the numerical balances 1702, 1704 are displayed. Also, in some embodiments, the customer may cause the numerical balances 1702, 1704 to display via a menu (e.g., the Preferences screen 1002, menus 1020) accessible on or through the client 40.

Figure 17A:
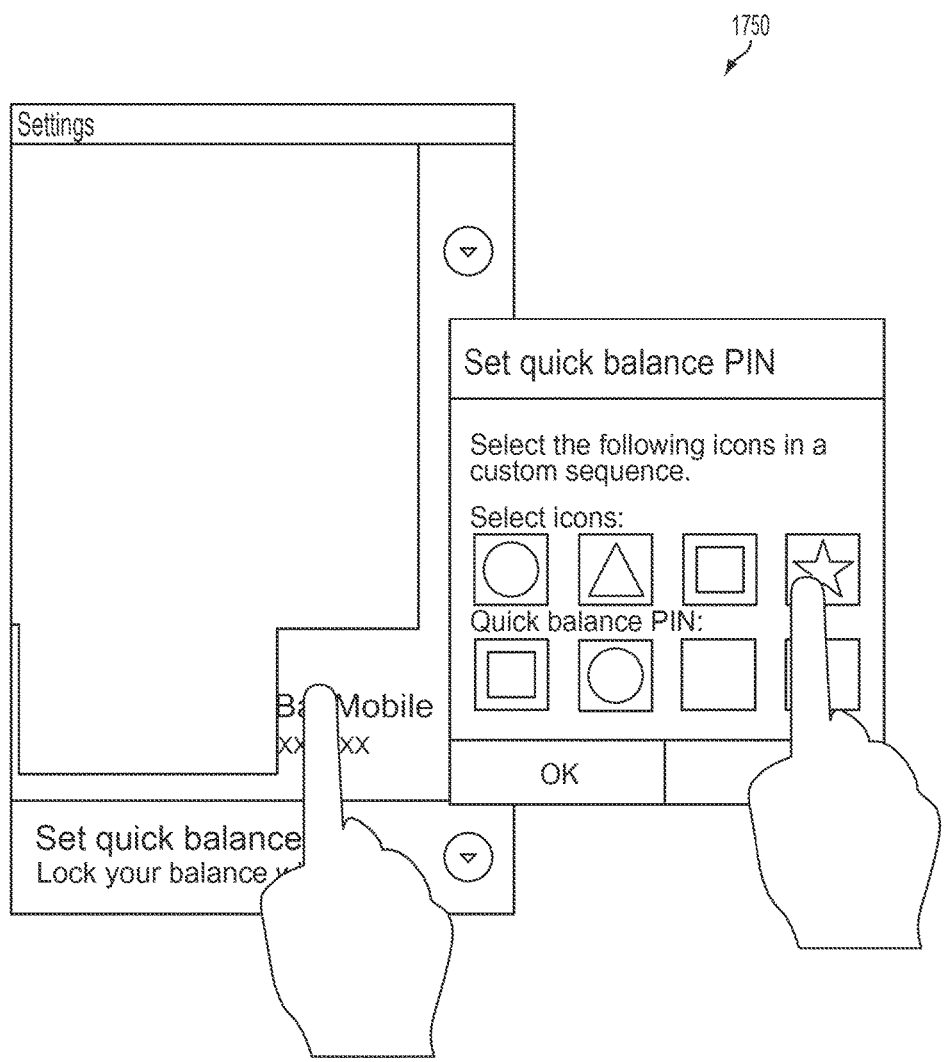
FIG. 17A is a screen shot showing one embodiment of a set-up screen where a customer may configure the desktop to display numerical balances of the accounts upon receipt of a predetermined code.

In some embodiments, the client 40 may display numerical balances of the accounts upon receiving a predetermined code from the customer. For example, FIG. 17A is a screen shot showing one embodiment of a set-up screen 1750 where a customer may configure the desktop UI 43 to display numerical balances of the accounts upon receipt of a predetermined code. A Set quick balance field 1752 may be selected by the customer to set the predetermined code. Upon selection of the Set quick balance field 1752, the client 40 may display a Set quick balance PIN window 1754. PIN may refer to Personal Identification Number although, as described herein, the predetermined code may include numbers, letters, shapes, and/or other characters.

Figure 17B:
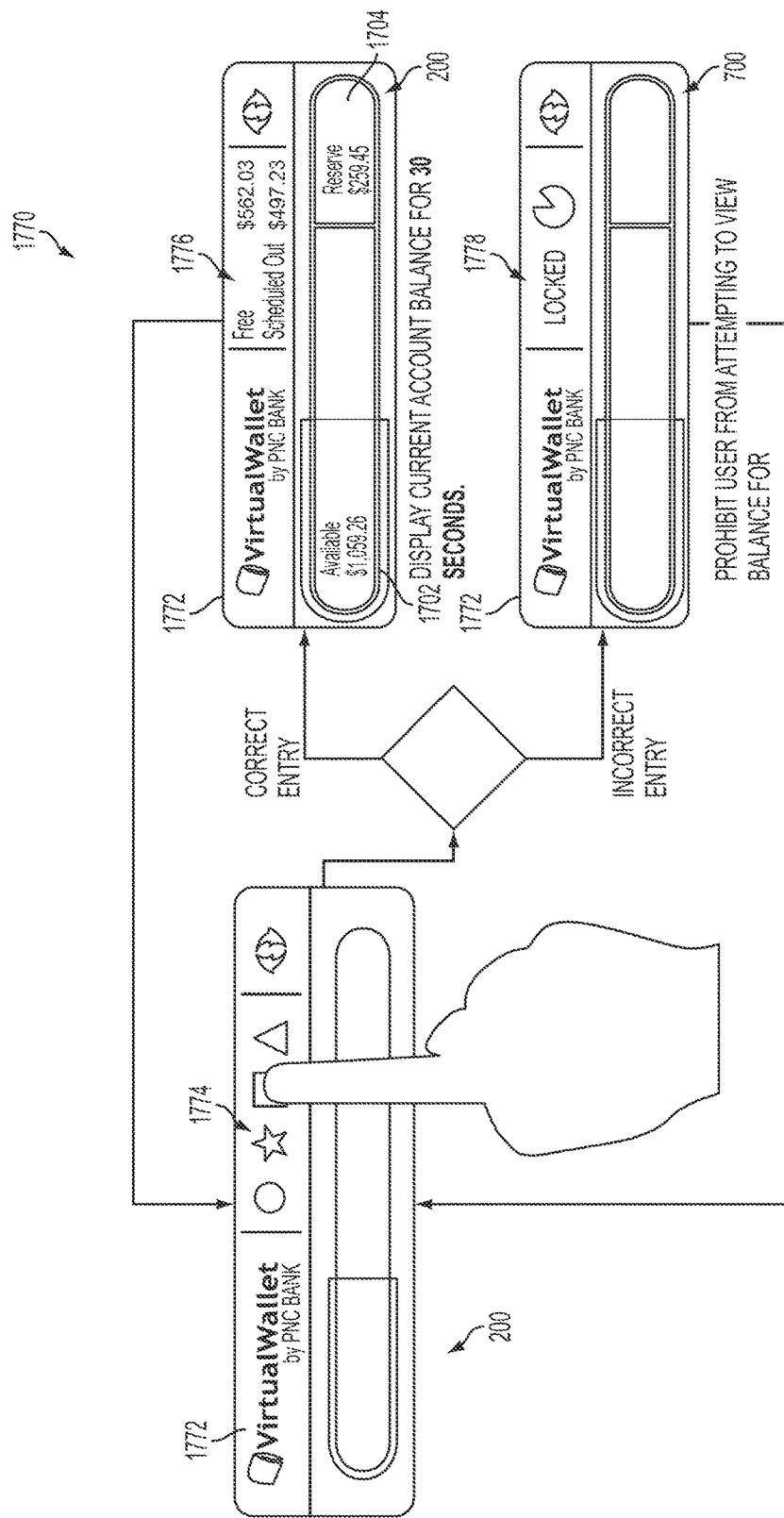
FIG. 17B is a workflow showing one embodiment of a process flow for receiving a predetermined code for displaying numerical balances of the accounts.

The Set quick balance PIN window 1754 may allow the customer to provide a PIN code that may be used to view the numerical balances of the accounts, for example, as illustrated by FIG. 17B. The PIN code may be comprised of any suitable alphanumeric or other characters. For example, FIG. 17A shows PIN codes comprised of various shape characters (e.g., circle, triangle, square, star, etc.). The customer may select shape characters from field 1756 to populate a PIN field 1758. Upon population, the PIN field 1758 may represent the customer's selected predetermined code.

FIG. 17B is a workflow showing one embodiment of a process flow 1770 for receiving a predetermined code for displaying numerical balances of the accounts. An implementation 1772 of the desktop UI 43 may comprise a balance indicator 200, as described herein, and a code field 1774 for receiving the predetermined code from the customer. The code field 1774 may comprise various characters that can make up an individual customer's predetermined code (e.g., alphanumeric characters, shape characters, etc.). The customer may select a sequence of characters from the code field 1774. If the customer indicates the correct sequence of characters (e.g., the predetermined code for the logged-in customer), then the implementation 1772 may display the balance indicator including numerical balances 1702, 1704. In some embodiments, an additional balance field 1776 may be include in addition to or instead of the code field 1774. If the customer does not indicate the correct sequence of characters, then numeric balances may not be displayed. In some embodiments, entering an incorrect code may lock the implementation 1772 so that further attempts to enter the code may not be possible. For example, the implementation 1772 may replace the code field 1774 with an indication 1778 that the desktop UI 43 is locked. The respective fields 1752, 1774 and icons 1756 may be selected in any suitable manner including, for example, a mouse or other tracking device, a touchpad or other touch sensitive screen, etc.

Figure 18:
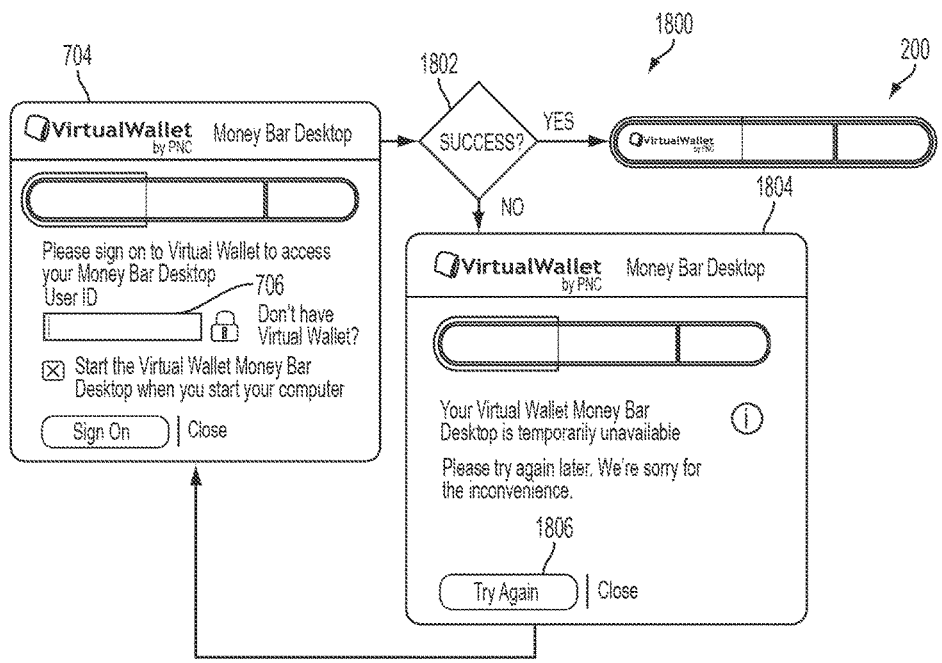
FIG. 18 is a workflow showing one embodiment of a process flow for handling a host system connection upon start-up of the desktop UI of FIG. 1.

Because the desktop UI 43 and balance indicator(s) 200 are generated from information received from the host system 7, the desktop UI 43 may have limited or no functionality if there is no available data link between the client 40 and the host system 7. The desktop UI 43 (e.g., via the interface application 226) may be configured to manage its connection to the host system 7 in any suitable manner. For example, FIG. 18 is a workflow showing one embodiment of a process flow 1800 for handling a host system 7 connection upon start-up of the desktop UI 43. First, the sign-on window 704 may be displayed to the customer, for example, as described above with respect to FIG. 7. If at 1802, the client 40 successfully reaches the host system 7, the desktop UI 43, including the balance indicator(s) 200 may launch as described above. If no connection is available between the client 40 and the host system 7, the client 40 (e.g., under the direction of the interface application 226) may display window 1804. Window 1804 may indicate that no connection is currently available. The customer may select a Try Again button 1806 to go back to the screen 704 and try again to connect to the host system 7. For example, the customer may select the Try Again button 1806 upon diagnosing and correcting any client-side connection problem. In some embodiments, the interface application 226 may be configured to automatically attempt to reach the host system 7 again upon the passing of a specified time period (e.g., five minutes, thirty minutes, etc.).

Figure 19:
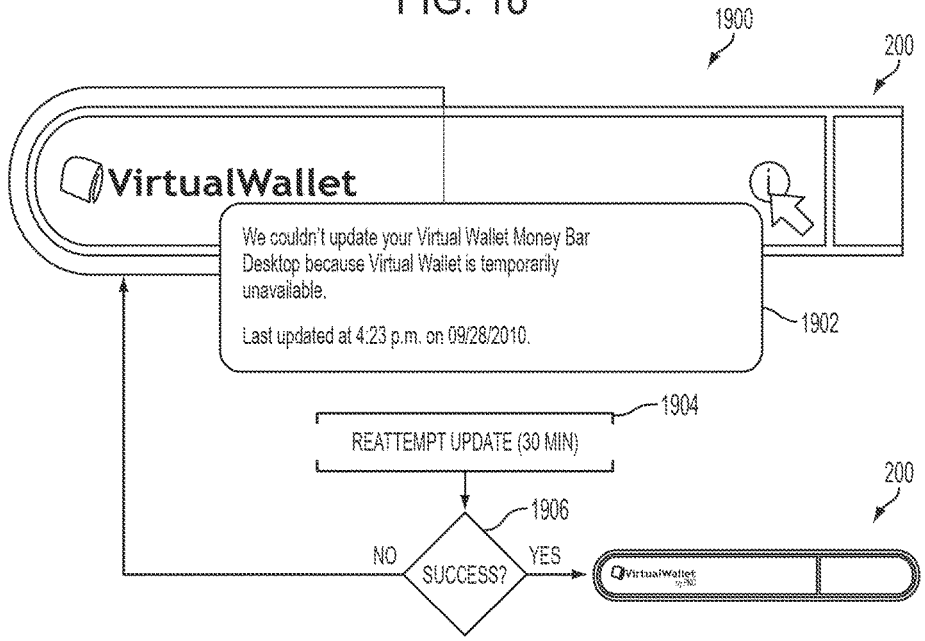
FIG. 19 is a workflow showing one embodiment of a process flow for handling a loss of connectivity to the host system while the client 40 is providing the desktop UI of FIG. 1.

FIG. 19 is a workflow showing one embodiment of a process flow 1900 for handling a loss of connectivity to the host system 7 while the client 40 is providing the desktop UI 43. If connectivity is lost while the desktop UI 43 (e.g., balance indicator(s) 200) is displayed, then the client 40 (e.g., under the direction of the interface application 226) may display a screen 1902 indicating the state of the connectivity. At 1904, the client 40 may wait a predetermined amount of time (e.g., five minutes, thirty minutes, etc.) and then attempt to re-connect with the host system 7, for example, to update the one or more balance indicators 200. If the re-connection is a success at 1906, then the client 40 may update the desktop UI 43 and display the updated balance indicator(s) 200. If the re-connection is not successful, the client 40 may, again, display the screen 1902 and attempt a new re-connection upon expiration of the predetermined time (or a new predetermined time).

In various embodiments, the desktop UI 43 described herein may be used in conjunction with a full Internet banking UI 42. The Internet banking UI 42 may be launched via the desktop UI 43. For example, the menus 1020, 1040 described above each comprising an entry for launching the Internet banking UI 42. The Internet banking UI 42 may be launched from the desktop UI 43 in any other suitable manner.

Figure 20:
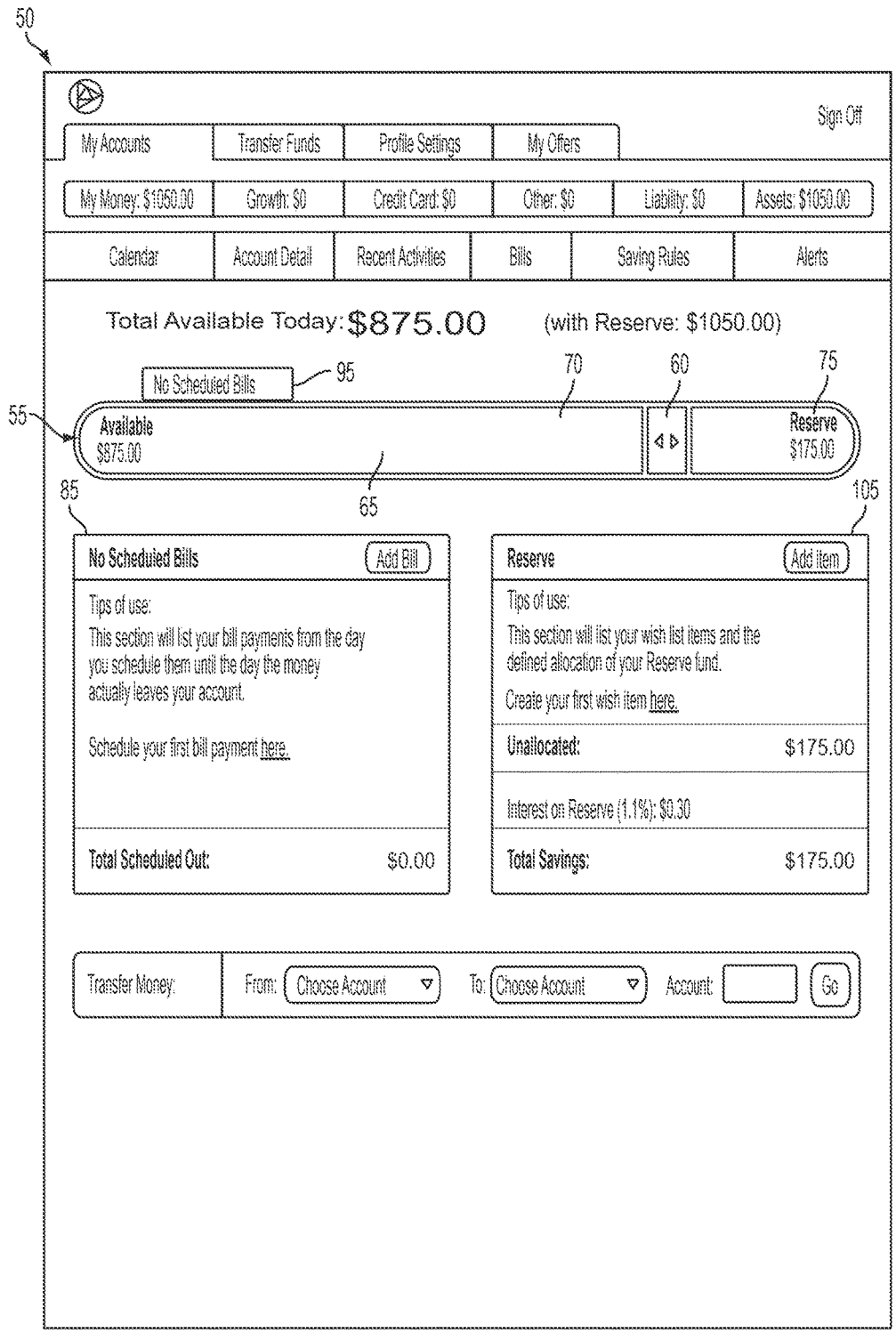
FIG. 20 is a screen shot showing one embodiment of a page of an Internet banking user interface displayed by a client.

Now that the desktop UI 43 has been described, additional details are provided regarding example embodiments of an Internet banking UI 42. FIG. 20 is a screen shot showing one embodiment of a page 50 of the Internet banking UI 42 displayed by a client 40. The page 50 may be implemented, for example, as a dynamic HTML Web page hosted by the Web server 10 that is accessible by the client 40 subsequent to customer authentication. In certain embodiments and as shown, the page 50 may be one of a plurality of linked pages that collectively define the UI 42. As discussed in further detail below, the page 50 may include various graphic and text features designed to efficiently communicate information regarding aspects of the customer's finances. Such information may include, for example, a current balance in one or more customer financial accounts, a portion of a current balance required to satisfy approaching financial obligations, a portion of a current balance allocated toward a particular financial goal, and amounts of scheduled bill payments and associated bill information.

As shown in FIG. 20, the page 50 may include an information graphic in the form of a slide controller 55 for displaying and controlling aspects of the customer's financial accounts. In certain embodiments and as shown, the slide controller 55 may be horizontally oriented relative to the page 50 and include a slidable element 60 that is positionable over a central portion of a background element 65 using, for example, a mouse or other pointing device associated with the client 40. The slidable element 60 may be, for example, a thumb element (as shown in FIG. 20) or any other suitable type of graphical element that may be selectively positioned relative to the background element 65. The slide controller 55 may be implemented on the interface page 50 using, for example, JavaScript or any other suitable programming tool for generating interactive graphical elements. According to various embodiments, the slide controller 55 may be configured to graphically integrate and display information pertaining to a first financial account and a second financial account associated with the customer, and to enable selective redistribution of the account balances in response to customer requests, as described herein. In certain embodiments and as shown, the first financial account may be a transactional, or "available," account for providing accessibility to funds on demand using, for example, a check or an electronic funds transfer, and the second financial account may be a savings, or "reserve," account.

As further shown in FIG. 20, the background element 65 of the slide controller 55 may be divided into a first segment 70 and a second segment 75 based on the position of the thumb element 60. The areas of the first and second segments 70, 75 may be representative of the balances contained in the first and second financial accounts, respectively. In the example embodiment shown in FIG. 20, the height of the background element 65 is constant, so the lengths of the first and second segments 70, 75 may be representative of the respective balances. For example, the slide controller 55 may indicate that the balance of the first financial account exceeds that of the second financial account by showing the first segment 70 with a larger area than the second segment 75. The relative amounts of the respective balances may be indicated by the difference in the areas between the segments 70, 75. The first and second segments 70, 75 may be suitably colored to enhance their contrast for viewing ease. In certain embodiments, for example, the first segment 70 may be green and the second segment 75 may be blue. Labels may be provided on each of the first and second segments 70, 75 to indicate the name and/or type of the corresponding account (e.g., available, reserve) and its balance. The labels may be positioned outside of the central portion of the background element 65 (e.g., at respective endpoints of the background element 65, as shown in FIG. 20) such that interference with the thumb element 60 is avoided.

Figure 21A:
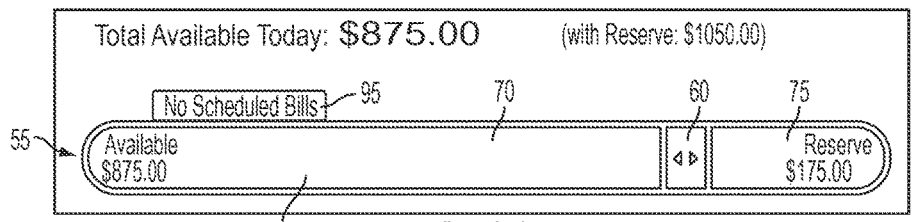
FIG. 21A is a screen shot showing one embodiment of a page of the Internet banking user interface of FIG. 20 with a slide controller thumb element in a first position.
Figure 21B:
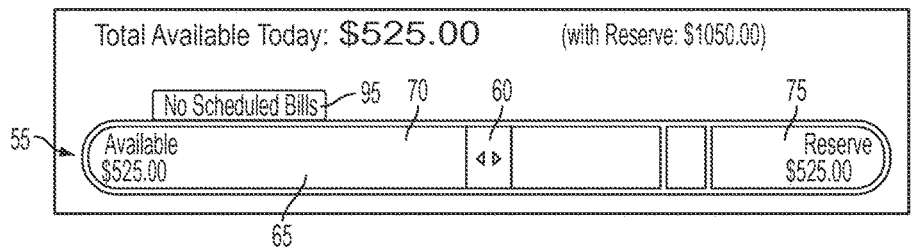
FIG. 21B is a screen shot showing one embodiment of a page of the Internet banking user interface of FIG. 20 with the slide controller thumb element in a second position.

According to various embodiments, the customer may cause a transfer of funds between the first and second financial accounts utilizing the slide controller 55 by changing the position of the thumb element 60 on the background element. FIG. 21A is a screen shot showing one embodiment of a page of the UI 42 with the thumb element 60 of the slide controller 55 in a first position. In the example shown in FIG. 21A, the first position may indicate that $875 of the $1,050 balance total is contained in the first financial account, with the remaining $175 contained in the second financial account. The area of the first segment 70 is greater than that of the second segment 75, thereby providing a graphical indication that the available account balance is larger than that of the reserve account. The difference in area between the first segment 70 and second segment 75; in some embodiments, may indicate the relative difference in balances between the financial accounts. The customer (e.g., via the client 40 and UI 42) may bring about a balance transfer between the financial accounts by changing the position of the thumb element 60. FIG. 21B is a screen shot showing one embodiment of a page of the Internet banking UI 42 with the thumb element 60 in a second position. In FIG. 21B, the position of the thumb element 60 has been changed relative to that of FIG. 21A such that the balance of the second financial account has increased by $350 to $525. The first financial account has been correspondingly decreased from $875 to $525. The areas of the first and second segments 70, 75 have decreased and increased, respectively, thus providing a graphical indication of the new balance distribution.

Figure 21C:
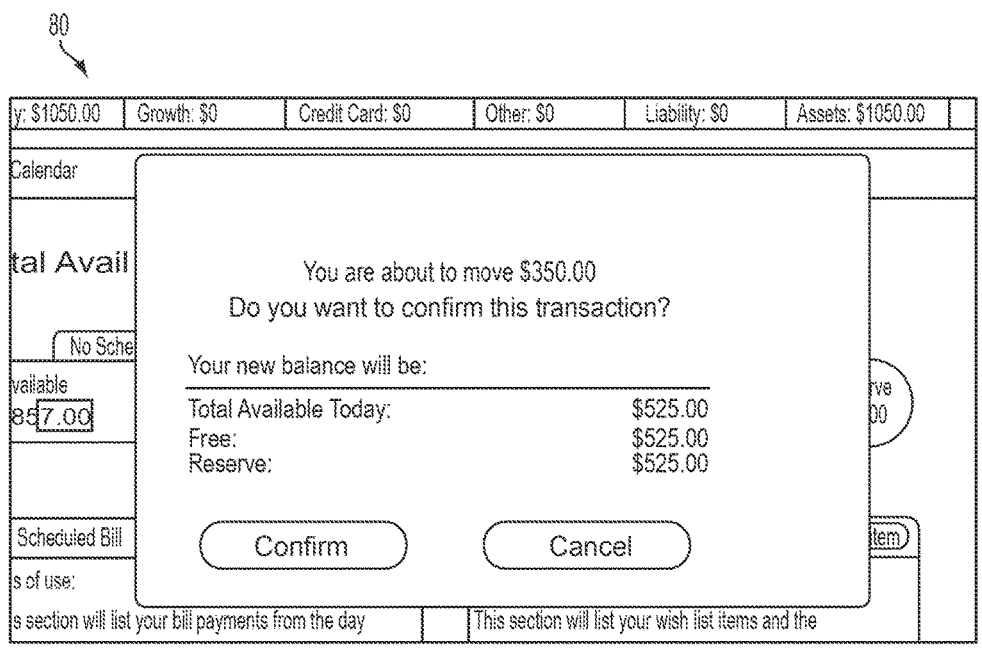
FIG. 21C is a screen shot showing one embodiment of a confirmation field of the Internet banking user interface of FIG. 20 for confirming a requested balance transfer.

In some example embodiments, a confirmation field may be displayed to the customer to confirm a requested balance transfer (e.g., a balance transfer requested by a change in the position of the thumb element 60). FIG. 21C is a screen shot showing one embodiment of a confirmation field 80. The confirmation field 80 may summarize changes to be made to the balances of the first and second financial accounts. In various embodiments, the confirmation field 80 may request confirmation or cancellation of the transaction by the customer. The confirmation field 80 may indicate, for example, the amount to be redistributed and the balances of the available and reserve accounts that will result. In the example transaction illustrated by FIGS. 21A-21C, the change in position of the thumb element 60 between FIGS. 21A and 21B indicates a transfer of $350 from the second financial account to the first financial account. The confirmation field 80 of FIG. 21C may indicate that the transfer amount is $350, and that the resulting balance in each of the available and reserve accounts will be $525. If user confirmation is provided, information regarding the transfer may be communicated to the host system 7 so that the balances of the first and second financial accounts may be updated accordingly. If the transaction is cancelled, no changes to the account balances will be made, and changes to the slide controller 55 resulting from the changed position of the thumb element 60 may be cancelled.

Accordingly, the position of the thumb element 60 may generally be changed in order to selectively transfer funds between the first and second financial accounts in any proportion. If desired, for example, the thumb element 60 may be positioned such that the entire balance total is placed in either of the available or reserve accounts. In this way, the available account and the reserve account behave as a single account. It will further be appreciated that slide controller 55 may be configured to enable redistribution of the balance total in any minimum increment desired. In certain embodiments, for example, the slide controller 55 may be configured to redistribute the balance total in minimum increments of one dollar.

Embodiments of the Internet banking UI 42 (e.g., including the page 50) may include graphic and text features for communicating information regarding the customer's bill payments. Such information may be derived, for example, through the customer's enrollment in an online bill payment service offered by the financial institution and/or a third party (e.g., a third-party service, a creditor, etc.). According to various embodiments, the electronic bill payments may be configured and scheduled via a bill payment page (not shown) of the Internet banking UI 42 that is accessible from the page 50, and balances due may be paid from the available account. In certain embodiments, the host system 7 may be configured such that the second financial account provides automatic overdraft protection to the first financial account. In the event of an overdraft, for example, a predetermined amount may be automatically transferred from the reserve account to the available account.

Figure 22:
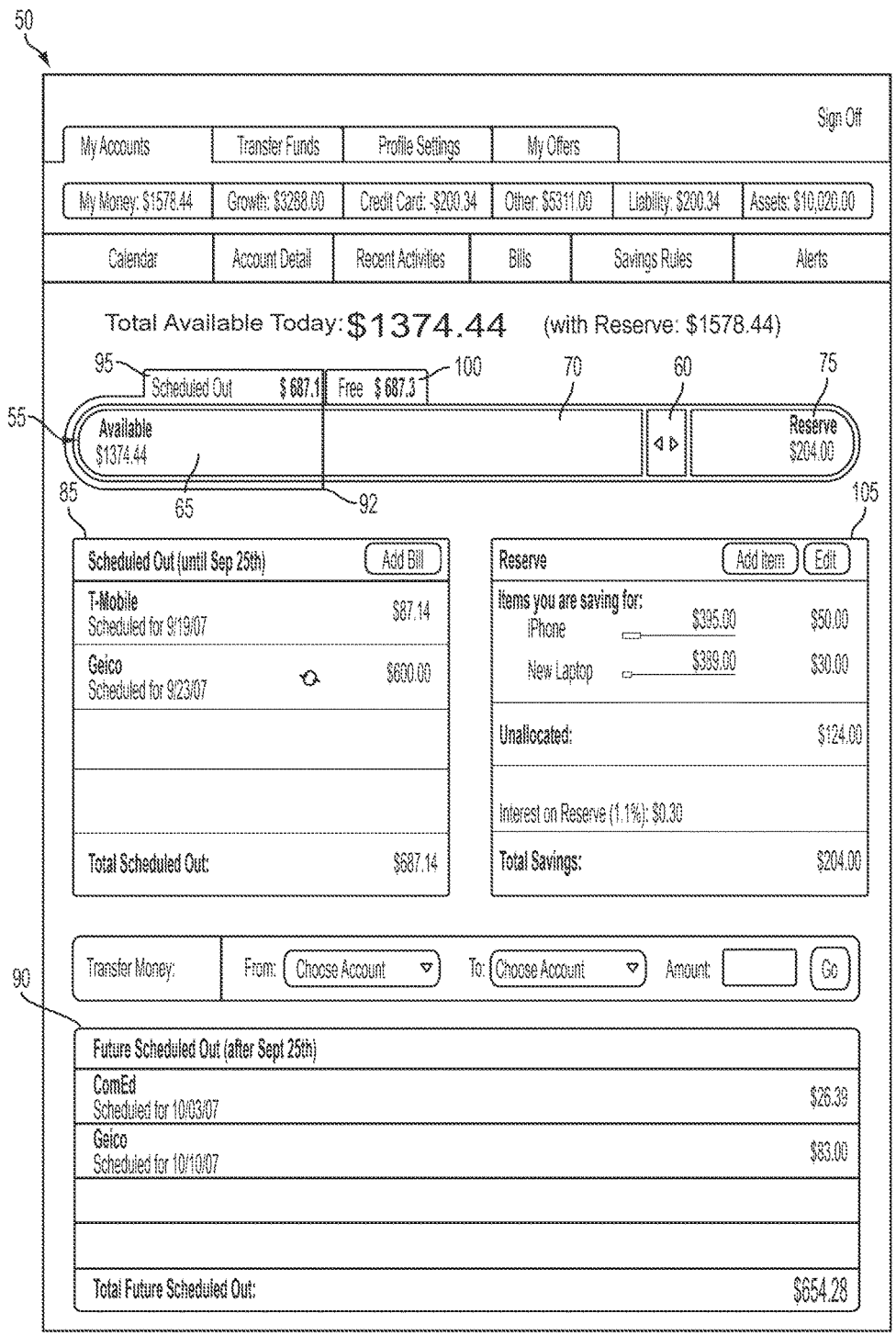
FIG. 22 is a screen shot showing one embodiment of the Internet banking interface of FIG. 20 including bill payment information.

In some embodiments, bill payment information may be presented graphically and/or textually in one or more fields provided on the page 50. FIG. 22 is a screen shot showing one embodiment of the page 50 of the Internet banking interface 42 including bill payment information. A first field 85 ("scheduled out") may present information regarding bill payments that are scheduled for payment in the near-term (e.g., until the next scheduled payday or within a predetermined time period measured from the current date), and a second field 90 ("future scheduled out") may present similar information for bill payments that are scheduled for payment at later dates. Bill payment information provided by each field 85, 90 may include, for example, the billing parties and the payment due to each, the scheduled date of each payment, and the total amount scheduled to be paid.

In certain embodiments, the slide controller 55 may be configured to graphically and/or textually present aspects of the bill payment information. In one such embodiment and with reference to FIG. 22, the slide controller 55 may include a graphical scheduled payments indicator 92 for graphically indicating the amount of funds necessary to satisfy all of the customer's near-term bill obligations (e.g., the total amount of near-term bill payments indicated by first field 85) relative to the available account balance from which the bill payment funds may be electronically withdrawn. As shown, the scheduled payments indicator 92 may be a bar element having a length determined by the total amount of near-term bill payments. In some embodiments, the background element 65 may be sufficiently transparent such that placement of the scheduled payments indicator 92 behind the background element 65 permits the scheduled payments indicator 92 to be partially visible therethrough. The position of the scheduled payments indicator 92 behind the background element 65 may be such that the proportional lengths of the first segment 70 and the scheduled payments indicator 92 graphically indicate the amount of the available account balance that will be consumed by the total amount of near-term bill payments.

In certain embodiments and as shown, the scheduled payments indicator 92 may include a first flag element 95 formed thereon that extends beyond the top of the background element 65 and contains text indicating the total amount of near-term bill payments scheduled to be paid from the available account (e.g., a balance of scheduled payments). In cases where no near-term bill payments are scheduled (as shown in FIG. 20, for example), the flag element 95 may contain text indicating that no bills are scheduled. Alternatively, the flag element 95 may be hidden from view in the absence of any near-term bill payments. The host system 7 may determine whether scheduled payments are near-term according to any suitable methodology. In some embodiments, near-term bill payments may be payments that are due before a next scheduled deposit to one or both of the financial accounts (e.g., a payday). In other embodiments, near-term bill payments may be bill payments that are due within a threshold time period (e.g., one month, one quarter, etc.). In cases where the scheduled payments indicator 92 indicates that an amount of the available account balance will be consumed by the bill payments in the near-term, the available account balance may not be encumbered by the anticipated payments. In other words, the available account balance indicated by the slide controller 55 may represent the actual amount that the customer may access at that point in time.

In certain embodiments and as further shown in FIG. 22, the slide controller 55 may further include a second flag element 100 adjacent the top of the background element 65 and containing an indication (e.g., a textual indication) of the amount of the first financial account balance in excess of the total amount of near-term bill payments. As shown, the flag element 100 may be positioned adjacent a portion of the first segment 70 that is not consumed by the bar element 92. In cases where no near-term bill payments are scheduled, or in cases where the total amount of near-term bill payments exceeds the balance of the available account, the flag element 100 may be hidden from view.

Figure 23:
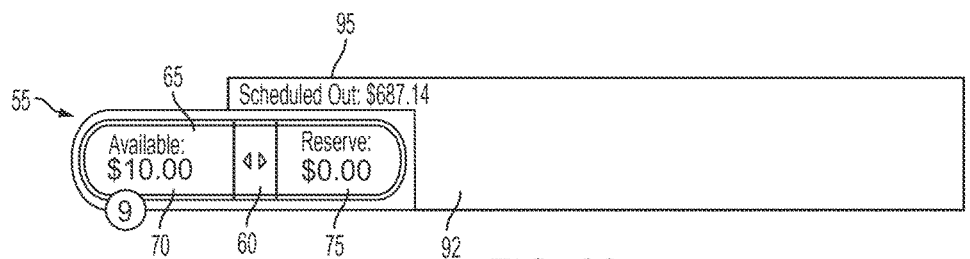
FIGS. 23-25 are screen shots showing example embodiments of the Internet banking interface of FIG. 20 with the slide controller showing various relationships between the lengths of the first and second segments and the scheduled payments indicator.
Figure 24:
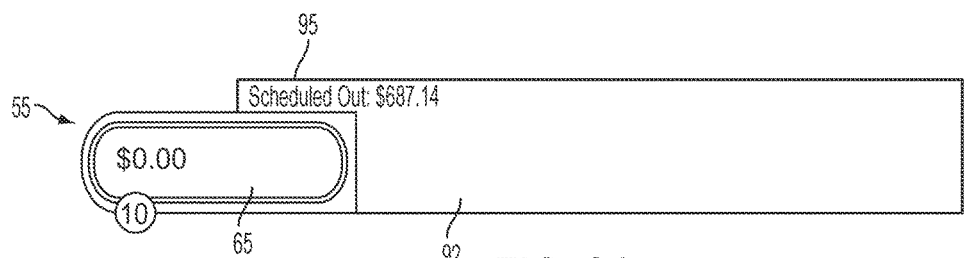
Figure 25:
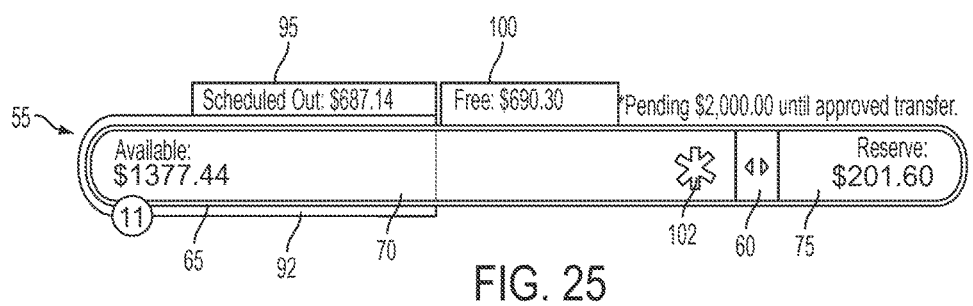

For embodiments of the slide controller 55 including a scheduled payments indicator 92 or other graphical element for indicating the amount of the available account balance consumed by approaching bill payments, the overall area of the slide controller 55 may be determined based on the total bill payment amount relative to the combined balances of the available account and the reserve account. In embodiments where the height of the slide controller 55 is constant, such as those shown in FIGS. 20-22, differences in area may be expressed as differences in length. Referring to the example shown in FIG. 22, the combined account balances ($1,578.44) exceed the total amount of near-term bill payments ($687.14). The area (e.g., length) of the slide controller 55 is thus determined by the overall length of the background element 65. FIGS. 23-25 are screen shots showing example embodiments of the Internet banking interface 42 with a slide controller 55 showing various relationships between the areas (e.g., lengths) of the first and second segments 70, 75 and the scheduled payments indicator 92. Each relationship may indicate a corresponding relationship between the balances of the financial accounts and the balance of scheduled payments. In the example of FIG. 23, the combined account balances ($10) are exceeded by the total amount of near-term bill payments ($687.14). In this case, the scheduled payments indicator 92 exceeds the length of the background element and thus dictates the overall length of the slide controller 55. Although not shown in FIG. 23, it will be appreciated that the colors of the first and second segments 70, 75 of the background element 65 may be altered to draw attention to the fact that the approaching bill payments exceed the combined account balances.

In certain embodiments and as further shown in FIG. 23, the slide controller 55 may be configured to display the second segment 75 of the background element 65 in cases where the second financial account contains a zero balance and the first financial account contains a non-zero balance. In certain embodiments, where both the available account and the reserve account contain zero balances and the amount of near-term bill payments is non-zero, such as shown in FIG. 24, the thumb element 60 may be hidden from view and the background element 65 uniformly colored (e.g., red) to indicate that the amount of near-term bill payments exceeds the combined account balances.

In various embodiments, the slide controller 55 may be configured to provide a graphical indication of a pending deposit into the available account and a text caption indicating the amount of the pending deposit. In certain embodiments and as shown in FIG. 25, for example, a pending deposit may be indicated by the presence of an asterisk 102 or other suitable symbol superimposed on the first segment 70 of the background element 65. The amount of the pending deposit may not be included in the available account balance until the deposit is approved by the banking institution. Conversely, charges pending against the available account may be reflected in the available account balance.

In certain embodiments, the page 50 may further include graphic and text features for allocating portions of the reserve account balance towards purchases anticipated in the future. With reference to FIG. 20, for example, the page 50 may include a field 105 ("reserve") listing the anticipated purchases, corresponding purchase prices, and an amount of the reserve account balance currently allocated to each purchase. This information may be editable by the customer, and additional purchases may be added to the field 105 as desired. The page 50 may further indicate an amount of the reserve account that is currently unallocated, and the total balance of the reserve account. In certain embodiments, the amount allocated to each purchase may be manually input into the corresponding field of the field 105 by the customer. Alternatively, the allocated amount may be increased in accordance with savings rules (e.g., event-based or periodic spending rules) configured by the customer via a separate UI page (not shown) linked to the page 50. Withdrawals from the reserve account (e.g., withdrawals resulting from the redistribution of funds from the reserve account to the available account) may initially be taken out of the unallocated portion of the reserve account balance, and the allocated amounts will only be depleted when the unallocated amount is zero.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function, including, for example, a combination of elements that performs that function. Furthermore, the invention, as defined by such means-plus-function claims, resides in the fact that the functionalities provided by the various recited means are combined and brought together in a manner as defined by the appended claims. Therefore, any means that can provide such functionalities may be considered equivalents to the means shown herein.

In general, it will be apparent to one of ordinary skill in the art that some of the embodiments as described hereinabove may be implemented in many different embodiments of software, firmware, and/or hardware. The software code or specialized control hardware used to implement some of the present embodiments is not limiting of the present invention. For example, the embodiments described hereinabove may be implemented in computer software using any suitable computer software language. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the present embodiments may be executed by programmable equipment, such as computers. Software that may cause programmable equipment to execute the processes may be stored in any storage device, such as, for example, a computer system (nonvolatile) memory, an optical disk, magnetic tape, or magnetic disk. Furthermore, some of the processes may be programmed when the computer system is manufactured or via a computer-readable medium. Such a medium may include any of the forms listed above with respect to storage devices and may further include, for example, a carrier wave modulated, or otherwise manipulated, to convey instructions that may be read, demodulated/decoded and executed by a computer.

It can also be appreciated that certain process aspects described herein may be performed using instructions stored on a computer-readable medium or media that direct a computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Computer devices disclosed herein may include memory for storing certain software applications used in obtaining, processing and communicating data. It can be appreciated that such memory may be internal or external to the disclosed embodiments. The memory may also include any means for storing software, including a hard disk, an optical disk, floppy disk, ROM (read only memory), RAM (random access memory), PROM (programmable ROM), EEPROM (electrically erasable PROM), and other computer-readable media.

In various embodiments of the present invention disclosed herein, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

A "computer," "computer system," "computing device," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, tablet computer or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

Various embodiments of the systems and methods described herein may employ one or more electronic computer data networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad neighborhood (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OS1 layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server, or application server system, may be a server that hosts an API to expose venue logic and venue processes for use by other applications. Examples of application server systems include J2EE or Java EE 5 application server systems including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application server systems may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application server systems may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A computer-implemented method for providing financial information to a user, the method comprising:

receiving, by a computing device and from a financial server system data indicative of:
  a balance of a first financial account of the user;
  a balance of a second financial account of the user; and
  a balance of scheduled payments to be deducted from the first financial account,
  wherein the computer device comprises at least one processor and operatively associated memory;
providing, by the computing device, a graphical user interface to the user;
displaying, via the graphical user interface provided by the computing device, a first segment having a first area proportional to the balance of the first financial account;
displaying, via the graphical user interface provided by the computing device, a second segment having a second area proportional to the balance of the second financial account, wherein a sum of the first area and the second area is substantially constant independent of the balances of the first and second financial accounts;
displaying, via the graphical user interface provided by the computing device, a scheduled payments indicator that comprises a bar element positioned behind the graphical user interface having a length determined by a portion of the balance of the first financial account necessary to meet the balance of scheduled payments, and wherein the graphical user interface has a default state where numerical values for the first balance and the second balance are not displayed, wherein the graphical user interface is configured to be transitioned from the default state to display the numerical values and transitioned back to the default state;
receiving, by the computing device, a selection of a balance indicator by the user;
after receiving the selection of the balance indicator by the user, transitioning the graphical user interface from the default state and displaying, by the computing device, a numerical indication of at least one of the balance of the first financial account, the balance of the second financial account and the balance of scheduled payments, wherein the selection of the balance indicator corresponds to at least one of:
  the user placing a cursor of the computing device over the balance indicator; and
  the user placing the cursor of the computing device over the balance indicator and selecting the balance indicator;
displaying, via the graphical user interface provided by the computing device, a divider positioned between the first segment and the second segment;
receiving an input associated with the divider from the user via the graphical interface provided by the computing device, the input associated with the divider comprising a prescribed amount for a transfer of funds from the first financial account to the second financial account or from the second financial account to the first financial account;
executing the transfer of funds in the prescribed amount from the first financial account to the second financial account or from the second financial account to the first financial account based on the input associated with the divider via the financial server system; and
displaying, via the graphical user interface provided by the computing device, a new balance of the first financial account or the second financial account according to the prescribed amount of the transfer of funds in response to the transfer of funds.

2. The method of claim 1, wherein the balance indicator comprises a hyperlink that, when selected by the user, causes the computer device to launch a connection to the financial server system, and further comprising receiving, by the computing system via the connection, a second user interface for managing at least one of the first financial account and the second financial account.

3. The method of claim 2, wherein the executing of the transfer of funds is carried out based on a confirmation received from the user.

4. The method of claim 1, wherein the balance indicator is a bar, wherein the first area corresponds to a first side of the bar, wherein the second area corresponds to a second side of the bar, and wherein the scheduled payments indicator is positioned at least partially around the first area.

5. The method of claim 1, wherein the balance indicator is positioned at a foreground location on the computing device.

6. The method of claim 1, further comprising:
  receiving, by the computer device and from a user, authentication information identifying the user;
  receiving, by the computer device and from the user, an indication to store the authentication information;
  storing, by the computer device, the authentication information at the memory;
  before receiving the balance of the first financial account, the balance of the second financial account and the balance of schedule payments, providing the authentication information to the financial server system.

7. The method of claim 1, further comprising:
  determining, by the computing device, whether a threshold time has passed since the most recent time that the computing device has provided the graphical user interface to the user;
  when the threshold time has not passed:
    retrieving from the memory stored authentication information for the user; and
    providing the authentication information to the financial server system before receiving the balance of the first financial account.

8. The method of claim 1, wherein the graphical user interface comprises a second balance indicator related to third and fourth financial accounts of the user, wherein the second balance indicator comprises:
  a first segment having a first area proportional to a balance of the third financial account;
  a second segment having a second area proportional to a balance of the fourth financial account; and
  a scheduled payments indicator positioned relative to the first area and comprises information regarding a segment of the balance of the third financial account necessary to meet a balance of schedule payments to be deducted from the third financial account.

9. The method of claim 8, wherein the third and fourth financial accounts are associated with a financial institution different than a financial institution associated with the first and second financial accounts.

10. The method of claim 1, further comprising:
  receiving, by the computing device and from the financial server system, an indication of a transaction on at least one of the first financial account and the second financial account and an indication of a new balance of at least one of the first financial account and the second financial account; and
  displaying, by the computing device, an alert indicative of the transaction.

11. The method of claim 10, wherein the displaying comprises displaying the alert of the transaction in real time.

12. The method of claim 10, wherein displaying the alert comprises the computing device supplementing the graphical interface with an alert indicator proximate the balance indicator, wherein the alert indicator comprises an indication of the transaction.

13. The method of claim 10, wherein displaying the alert comprises the computing device providing an alert through an operating system of the computing device.

14. The method claim 1, further comprising:
prior to transitioning the graphical user interface from the default state and displaying, by the computing device, the numerical indication of at least one of the balance of the first financial account, the balance of the second financial account and the balance of scheduled payments, receiving from the user a code comprising a plurality of characters; and
conditioned upon the code corresponding to a predetermined code of the user, transitioning the graphical user interface from the default state and displaying, by the computing device, the numerical indication of at least one of the balance of the first financial account, the balance of the second financial account and the balance of scheduled payments.

15. The method of claim 1, further comprising:
determining whether an amount of near-term bill payments is present;
upon a determination that an amount of near-term bill payments is present, displaying, via the graphical user interface provided by the computing device, a flag element indicating the amount of near-term bill payments that is present.

16. A computer-implemented system for providing financial information to a user, the system comprising:
a computing device comprising at least one processor and operatively associated memory, wherein the computing device is programmed to:
receive from a financial server system data indicative of:
a balance of a first financial account of the user
a balance of a second financial account of the user; and
a balance of scheduled payments to be deducted from the first financial account;
provide a graphical interface to the user, wherein the graphical interface comprises a balance indicator comprising:
a first segment having a first area proportional to the balance of the first financial account;
a second segment having a second area proportional to the balance of the second financial account, wherein a sum of the first area and the second area is substantially constant independent of the balances of the first and second financial accounts;
a scheduled payments indicator that comprises a bar element positioned behind the graphical user interface having a length determined by a portion of the balance of the first financial account necessary to meet the balance of scheduled payments, and wherein the graphical user interface has a default state where numerical values for the first balance and the second balance are not displayed, wherein the graphical user interface is configured to be transitioned from the default state to display the numerical values and transitioned back to the default state; and
a divider positioned between the first segment and the second segment;
receive, by the computing device, a selection of the balance indicator;
after receiving the selection of the balance indicator by the user, transitioning the graphical user interface from the default state and displaying, by the computing device, a numerical indication of at least one of the balance of the first financial account, the balance of the second financial account and the balance of scheduled payments, wherein the selection of the balance indicator corresponds to at least one of:
the user placing a cursor of the computing device over the balance indicator; and
the user placing the cursor of the computing device over the balance indicator and selecting the balance indicator;
receive an input associated with the divider to the graphical interface from the user, the input associated with the divider comprising a prescribed amount for a transfer of funds from the first financial account to the second financial account or from the second financial account to the first financial account;
execute the transfer of funds in the prescribed amount from the first financial account to the second financial account or from the second financial account to the first financial account based on the input associated with the divider; and
display a new balance of the first financial account or the second financial account according to the prescribed amount of the transfer of funds in response to the transfer of funds.

17. A computer-implemented system for providing financial information to a user, the system comprising:
a processor and non-transitory computer readable medium comprising instructions that when executed by the processor cause the processor to perform the following functions:
receive from a financial server system data indicative of:
a balance of a first financial account of the user;
a balance of a second financial account of the user; and
a balance of scheduled payments to be deducted from the first financial account;
provide a graphical interface to the user, wherein the graphical interface comprises a balance indicator comprising:
a first segment having a first area proportional to the balance of the first financial account;
a second segment having a second area proportional to the balance of the second financial account, wherein a sum of the first area and the second area is substantially constant independent of the balances of the first and second financial accounts;
a scheduled payments indicator that comprises a bar element positioned behind the graphical user interface having a length determined by a portion of the balance of the first financial account necessary to meet the balance of scheduled payments, and wherein the graphical user interface has a default state where numerical values for the first balance and the second balance are not displayed, wherein the graphical user interface is configured to be transitioned from the default state to display the numerical values and transitioned back to the default state; and a divider positioned between the first segment and the second segment;

receive, by the computing device, a selection of the balance indicator;

after receiving the selection of the balance indicator by the user, transitioning the graphical user interface from the default state and displaying, by the computing device, a numerical indication of at least one of the balance of the first financial account, the balance of the second financial account and the balance of scheduled payments, wherein the selection of the balance indicator corresponds to at least one of:

the user placing a cursor of the computing device over the balance indicator; and the user placing the cursor of the computing device over the balance indicator and selecting the balance indicator;

receive an input associated with the divider to the graphical interface from the user, the input associated with the divider comprising a prescribed amount for a transfer of funds from the first financial account to the second financial account or from the second financial account to the first financial account;

execute the transfer of funds in the prescribed amount from the first financial account to the second financial account or from the second financial account to the first financial account based on the input associated with the divider; and display a new balance of the first financial account or the second financial account according to the prescribed amount of the transfer of funds in response to the transfer of funds.

18. The method of claim 1, further comprising:

determining whether a projected balance of at least one of the first financial account and second financial account will drop below a predetermined threshold amount, wherein the determining is based on scheduled deposits and withdrawals of the at least one of the first financial account and second financial account;

upon a determination that the projected balance of the at least one of the first financial account and second financial account will drop below the predetermined threshold amount, displaying a projection based account warning.

* * * * *